(12) United States Patent
Hyun et al.

(10) Patent No.: US 11,606,422 B2
(45) Date of Patent: Mar. 14, 2023

(54) SERVER FOR CONTROLLING DATA TRANSMISSION THROUGH DATA PIPELINE AND OPERATION METHOD THEREOF

(71) Applicant: SAMSUNG ELECTRONICS CO., LTD., Suwon-si (KR)

(72) Inventors: Seungyeol Hyun, Suwon-si (KR); Inki Hwang, Suwon-si (KR); Jemin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/580,337

(22) Filed: Jan. 20, 2022

(65) Prior Publication Data

US 2022/0232070 A1   Jul. 21, 2022

Related U.S. Application Data

(63) Continuation of application No. PCT/KR2022/000753, filed on Jan. 14, 2022.

(30) Foreign Application Priority Data

Jan. 20, 2021  (KR) .......................... 10-2021-0008292

(51) Int. Cl.
   *H04L 67/1031*   (2022.01)
(52) U.S. Cl.
   CPC .............................. *H04L 67/1031* (2013.01)
(58) Field of Classification Search
   None
   See application file for complete search history.

(56) References Cited

U.S. PATENT DOCUMENTS

| | | | | |
|---|---|---|---|---|
| 5,303,261 | A * | 4/1994 | Junod | ................... G06F 5/065 455/14 |
| 7,860,916 | B2 * | 12/2010 | Blaszczak | ............ G06F 12/023 709/200 |
| 8,037,123 | B2 * | 10/2011 | Wei | ...................... G06F 9/4862 709/202 |

(Continued)

FOREIGN PATENT DOCUMENTS

| KR | 10-1958885 B1 | 7/2019 |
|---|---|---|
| WO | 2019/135207 A1 | 7/2019 |

OTHER PUBLICATIONS

International Search Report and Written Opinion dated Apr. 26, 2022, issued by the International English Searching Authority in International Application No. PCT/KR2022/000753 (PCT/ISA/220, 210, 237).

*Primary Examiner* — Backhean Tiv
(74) *Attorney, Agent, or Firm* — Sughrue Mion, PLLC

(57) ABSTRACT

Provided are a server for controlling data transmission through a data pipeline, and an operation method thereof. A pipeline control server is configured to create and dispose a data broker including a message queue, between a data source and a data sink according to a registration event of the data sink, and to provision an infra of the data pipeline, and an operation method thereof. A pipeline control server is configured to schedule an operation time point of a data dispersal pipeline that transmits data to a data sink based on an operation event of a data ingestion pipeline that transmits data from a data source to a data broker, and an operation method thereof.

15 Claims, 12 Drawing Sheets

(56) References Cited

U.S. PATENT DOCUMENTS

| | | | |
|---|---|---|---|
| 8,266,496 B2* | 9/2012 | Flynn | G06F 3/0679 |
| | | | 714/773 |
| 9,313,189 B2* | 4/2016 | Tankov | H04L 67/141 |
| 9,495,241 B2* | 11/2016 | Flynn | G06F 11/108 |
| 9,588,822 B1 | 3/2017 | Shih et al. | |
| 10,019,353 B2* | 7/2018 | Orme | H05K 7/1444 |
| 10,057,150 B2* | 8/2018 | Nolan | H04L 43/10 |
| 10,698,756 B1* | 6/2020 | Abdelsalam | G06F 11/0787 |
| 11,256,702 B2* | 2/2022 | Colcord | G06F 9/541 |
| 2014/0348177 A1 | 11/2014 | Tierney et al. | |
| 2015/0372940 A1 | 12/2015 | Tompkins | |
| 2016/0164727 A1 | 6/2016 | Cimprich et al. | |
| 2020/0012593 A1* | 1/2020 | Maag | G06F 11/0775 |
| 2020/0174840 A1 | 6/2020 | Zhao et al. | |
| 2022/0232070 A1* | 7/2022 | Hyun | H04L 67/60 |

* cited by examiner

SERVER FOR CONTROLLING DATA TRANSMISSION THROUGH DATA PIPELINE AND OPERATION METHOD THEREOF

CROSS-REFERENCE TO RELATED APPLICATIONS

This application is a bypass continuation application of International Application No. PCT/KR2022/000753, filed on Jan. 14, 2022, which is based on and claims priority to Korean Patent Application No. 10-2021-0008292, filed on Jan. 20, 2021, in the Korean Intellectual Property Office, the disclosure of which is incorporated by reference herein in its entirety.

BACKGROUND

1. Field

The disclosure relates to a server for controlling and managing data transmission through a data pipeline, and an operation method thereof. More particularly, the disclosure relates to a pipeline control server for configuring, controlling, and managing a data pipeline for performing extraction, transformation, and loading (ETL) of data from a data source to a data sink, and an operation method of the pipeline control server.

2. Description of Related Art

Recently, cloud services in which users may access an infrastructure (hereinafter, referred to "infra"), a platform, or software via a network have been widely used. In particular, cloud service providers (CSPs) provide services for storing mass data (big data) and transmitting the data to consumers via a network. When data is transmitted through a CSP, a data source storing the data and a data sink to receive the data may have a 1:N relationship, in which case the data is extracted, transformed, and loaded (ETL) through a data pipeline.

In a typical 1:N relationship-based data pipeline, a data rate may be affected by a location of the data sink (a region in which the data sink is located or a server location), and a transmission failure problem may occur. In addition, when a location of the data source (a region in which the data source is located or a server location) and a location of the data sink are different from each other, a network cost increases.

In the 1:N relationship-based data pipeline, when the data pipeline is executed by streaming despite the irregularity of intervals of data transmission through the data pipeline, the data pipeline is idle during most of the time, and thus, there is a problem in that an unnecessary cost is consumed. In addition, when a plurality of data pipelines are managed, a large amount of computing resources are required, and thus, to resolve this problem, a time batch scheme in which the data pipeline is executed at certain time intervals is used, in which case there is a limitation that real-time execution is not guaranteed.

SUMMARY

Provided are a pipeline control server configured to create and dispose a data broker including a message queue between a data source and a data sink according to a registration event of the data sink, and provision an infra of a data pipeline, so that a computing resource cost is efficiently used while reducing a load of the data source, and an operation method thereof.

Further, provided are a pipeline control server configured to schedule an operation time point of a data dispersal pipeline that transmits data to a data sink based on an operation event of a data ingestion pipeline that transmits data from a data source to a data broker, so that real-time data transmission is guaranteed, and a computing resource is efficiently used, and an operation method thereof.

According to an aspect of the disclosure, there is provided a method of controlling data transmission through a data pipeline, the method including: detecting a registration event of a data sink for receiving data from a data source; based on the registration event of the data sink, obtaining parameter information including at least one of a maximum connectable number of data sources, a number of data sinks, a region in which a cloud service providing server is located, or a number of data sinks for each region; determining, based on the parameter information, a provisioning region of a data broker including a message queue; and provisioning, based on the provisioning region of the data broker, a pipeline infrastructure (infra) for executing the data pipeline that performs movement and transformation of data between the data source and the data broker and between the data broker and the data sink.

The method may further include scheduling for determining an operation time point of the data pipeline for transmitting data through the data pipeline.

The detecting the registration event of the data sink may include obtaining at least one of the number of data sinks, a region in which the data sink is located, a type of the data sink, a transformation configuration of the data pipeline, or schedule information regarding an operation time point of the data pipeline.

The determining the provisioning region of the data broker may include: comparing the maximum connectable number of the data sources with the number of the data sinks; and determining, based on a result of the comparing, whether to create the data broker.

The data sink may include a plurality of data sinks, and the determining the provisioning region of the data broker may include determining a region in which the plurality of data sinks are located, as the provisioning region of the data broker.

A first data sink that is pre-registered may be located in a first region, the detecting the registration event of the data sink may include detecting a new registration event of receiving information of a second data sink located in a second region, and the determining the provisioning region of the data broker may include determining whether to additionally create a new data broker in the second region based on a number of second data sinks that are newly registered, a network cost of transmitting data through the data pipeline, and an operational cost of the data broker.

The method may further include identifying whether the pipeline infra for executing the data pipeline is provisioned.

The detecting the registration event of the data sink may include: detecting a state change related to creation and location movement of the data sink according to a preset time interval; and based on the state change of the data sink being detected, obtaining information of the data sink.

According to an aspect of the disclosure, there is provided a method of controlling a data transmission schedule through a data pipeline, the method including: executing a data ingestion pipeline for data transmission from a data source to a message queue; detecting an operation event related to extraction, transformation, and loading of data through the data ingestion pipeline; based on the operation event of the data ingestion pipeline, provisioning a pipeline infrastructure (infra) to execute a data dispersal pipeline for data transmission from the message queue to a data sink; and performing scheduling of determining an operation point of the data dispersal pipeline based on a time point at which the operation event of the data ingestion pipeline is detected.

The method may further include: obtaining data transmission history information including information about at least one of a size of data extracted, transformed, and loaded through the data ingestion pipeline or an execution time of the data ingestion pipeline; and estimating a computing resource size of the data dispersal pipeline based on the data transmission history information, wherein the provisioning the pipeline infra may include provisioning the pipeline infra based on the estimated computing resource size of the data dispersal pipeline.

According to an aspect of the disclosure, there is provided a server for controlling data transmission through a data pipeline, the server including: a network interface configured to transmit data to and receive data from a cloud service providing server; a memory storing a program including one or more instructions; and a processor configured to execute the one or more instructions to: detect a registration event of a data sink for receiving data from a data source of the cloud service providing server; based on the registration event of the data sink, obtain parameter information including at least one of a maximum connectable number of data sources, a number of data sinks, a region in which the cloud service providing server is located, or a number of data sinks for each region; determine, based on the parameter information, a provisioning region of a data broker including a message queue; and provision, based on the provisioning region of the data broker, a pipeline infrastructure (infra) for executing the data pipeline that performs a movement and transformation of data between the data source and the data broker and between the data broker and the data sink.

The processor may be further configured to execute the one or more instructions to obtain, through the network interface, at least one of the number of data sinks, a region in which the data sink is located, a type of the data sink, credential information of the data sink, a transformation configuration of the data pipeline, or schedule information regarding an operation time point of the data pipeline.

The processor may be further configured to execute the one or more instructions to: compare the maximum connectable number of the data sources with the number of the data sinks, and determine whether to create the data broker based on a result of the comparison.

The data sink may include a plurality of data sinks, and the processor may be further configured to execute the one or more instructions to determine a region in which the plurality of data sinks are located as the provisioning region of the data broker.

A first data sink that is pre-registered may be located in a first region, and the processor may be further configured to execute the one or more instructions to: detect a new registration event of receiving information about a second data sink located in a second region, and determine whether to additionally create a new data broker in the second region by considering the number of the second data sinks that are newly registered, a network cost of transmitting data through the data pipeline, and an operational cost of the data broker.

The processor may be further configured to execute the one or more instructions to identify whether the pipeline infra for executing the data pipeline is provisioned.

The processor may be further configured to execute the one or more instructions to: detect a state change related to creation and location movement of the data sink according to a preset time interval; and based on the state change of the data sink being detected, obtain information about the data sink.

According to an aspect of the disclosure, there is provided a server for controlling a data transmission schedule through a data pipeline, the server including: a network interface configured to transmit and receive data to and from a cloud service providing server; a memory storing a program including one or more instructions; and a processor configured to execute the one or more instructions to: execute a data ingestion pipeline for data transmission from a data source within the cloud service providing server to a message queue; detect an operation event related to extraction, transformation, and loading of data through the data ingestion pipeline; based on the operation event of the data ingestion pipeline, provision a pipeline infrastructure (infra) to execute a data dispersal pipeline for data transmission from the message queue to a data sink; and schedule an operation time point of the data dispersal pipeline based on a time point at which the operation event of the data ingestion pipeline is detected.

The processor may be further configured to execute the one or more instructions to: obtain, through the network interface, data transmission history information including information about at least one of a size of data extracted, transformed, and loaded through the data ingestion pipeline or an execution time of the data ingestion pipeline; estimate a computing resource size of the data dispersal pipeline based on the data transmission history information; and provision the pipeline infra based on the estimated computing resource size of the data dispersal pipeline.

According to an aspect of the disclosure, there is provided a computer program product including a non-transitory computer-readable storage medium storing instructions that when executed by a server, cause the server to perform a method of controlling data transmission through a data pipeline, the method including: detecting a registration event of a data sink for receiving data from a data source, based on the registration event of the data sink, obtaining parameter information including at least one of a maximum connectable number of data sources, a number of data sinks, a region in which a cloud service providing server is located, or the number of data sinks for each region, determining a provisioning region of a data broker including a message queue based on the parameter information, and provisioning, based on the provisioning region of the data broker, a pipeline infra for executing the data pipeline that performs a movement and transformation of data between the data source and the data broker and between the data broker and the data sink.

DETAILED DESCRIPTION

Figure 1:
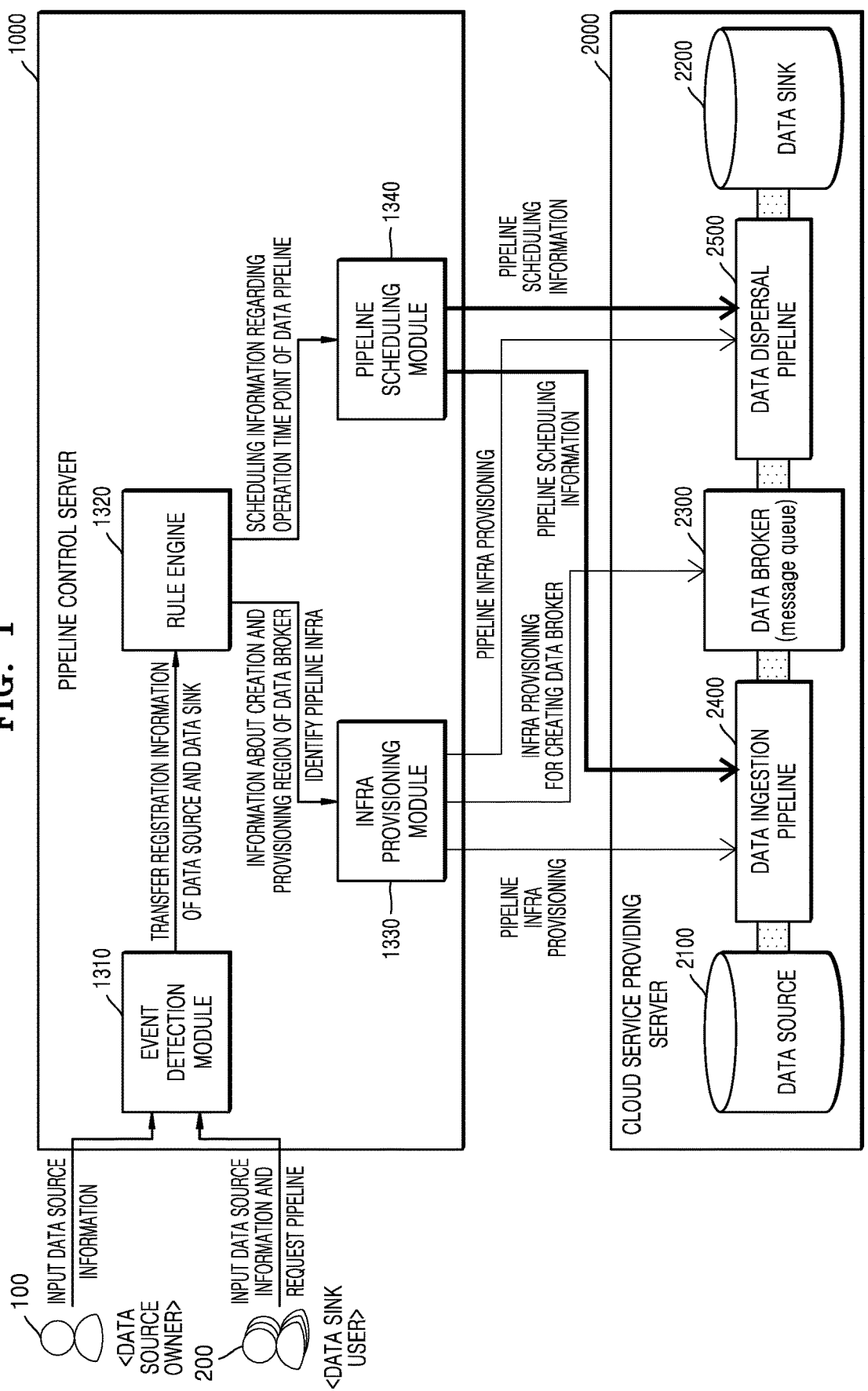
FIG. 1 is a diagram illustrating an operation of a pipeline control server that controls data transmission through a cloud service providing server in a network environment, according to an embodiment of the disclosure.

Hereinafter, embodiments of the disclosure will be described in detail with reference to the accompanying drawings.

In describing the embodiments, descriptions of technical contents that are well known in the technical field to which the disclosure pertains and are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. In addition, the size of each component does not fully reflect the actual size. In each figure, the same or corresponding elements are assigned the same reference numerals.

Throughout the disclosure, the expression "at least one of a, b or c" indicates only a, only b, only c, both a and b, both a and c, both b and c, all of a, b, and c, or variations thereof.

Advantages and features of the disclosure, and a method for achieving them will become apparent with reference to the embodiments described below in detail in conjunction with the accompanying drawings. However, the disclosure is not limited to the embodiments described below, but may be implemented in a variety of different forms, and the present embodiments are only provided so that the disclosure is complete, and to fully inform those of ordinary skill in the art to which the disclosure pertains, of the scope of the disclosure, which will be defined by the scope of the claims. Like reference symbols refer to like elements throughout the disclosure.

At this time, it will be understood that each block of the flowchart diagrams and combinations of the flowchart diagrams may be performed by computer program instructions. These computer program instructions may be mounted on a processor of a general purpose computer, special purpose computer, or other programmable data processing equipment, and thus, instructions performed through the processor of a computer or other programmable data processing equipment generate means for performing functions described in the flowchart block(s). These computer program instructions may also be stored in a computer-executable or computer-readable memory that may direct a computer or other programmable data processing equipment to implement a function in a particular manner, and thus, instructions stored in the computer-executable or computer-readable memory may be used to produce an article of manufacture containing instruction means for performing the function described in the flowchart block(s). The computer program instructions may also be mounted on a computer or other programmable data processing equipment, and thus, instructions that perform functions of a computer or other programmable data processing equipment by performing a series of operational steps performed on the computer or other programmable data processing equipment and creating a computer-executable process may provide operations for executing the functions described in the flowchart block(s).

In addition, each block may represent a module, segment, or a portion of code including one or more executable instructions for executing specified logical function(s). It should also be noted that in some alternative implementations the functions mentioned in the blocks occur out of order. For example, two blocks shown one after another may in fact be performed substantially simultaneously, or the blocks are sometimes performed in the reverse order according to the corresponding function.

In the disclosure, terms such as ". . . unit" or ". . . module" mean a unit that processes at least one function or operation, which is implemented as hardware or software, or a combination of hardware or software. However, ". . . unit" or ". . . module" is not meant to be limited to software or hardware. The term ". . . unit" or ". . . module" may be in an addressable storage medium or may be configured to reproduce one or more processors. Thus, as an example, ". . . unit" or ". . . module" includes components such as software components, object-oriented software components, class components, and task components, processes, functions, attributes, procedures, sub-routines, segments of a program code, drivers, firmware, microcodes, circuits, data, database, data structures, tables, arrays, and variables.

In the disclosure, "a cloud service provider (CSP)" refers to a cloud computing platform service provider (or company) that stores mass data and transmits the data to a data consumer (or data demander) through a network. The CSP may provide data infrastructure (hereinafter, referred to "infra"), platforms, or software. The CSP may include, for example, Amazon Web Services (AWS), Google Cloud Platform, IBM Cloud, Microsoft Azure, Alibaba Cloud, or the like.

In the disclosure, "a data source" is a repository storing data. The data source may store data for analyzing big data. The data source may include at least one non-volatile memory storing data. The data source may include at least one of a hard disk, a solid state drive (SSD), a flash memory, a multimedia card micro type, a card type memory (for example, an Secure Digital (SD) memory, an eXtreme Digital (XD) memory, etc.), a magnetic memory, a magnetic disk, or an optical disk.

In the disclosure, "a data sink" is a repository that receives data from a data source through a data pipeline and stores the data. Like the data source, the data sink may include a non-volatile memory. The data sink may include at least one of a hard disk, an SSD, a flash memory, a multimedia card micro type, a card type memory (for example, an SD memory, an XD memory, etc.), a magnetic memory, a magnetic disk, or an optical disk.

The data source and the data sink may include, for example, an object storage such as AWS Simple Cloud Storage (Amazon S3) and Google Cloud Storage (GCS), a data warehouse such as Apache Hive, or a Relational Database Management System (RDBMS) such as MySQL and PostgreSQL.

In the disclosure, "a data pipeline" is an application for controlling data transmission from a data source to a data sink. The data pipeline may automate a movement and transformation of data regardless of a changed infra of a data repository (a data source and a data sink). The data pipeline may not only transmit data, but may also perform end-to-end data transformation functions (extraction, transformation, and loading (ETL)) from a data source to a data sink. In an embodiment of the disclosure, the data pipeline may include an application executed based on a big data framework configured with an open source such as Apache Hadoop, Apache Spark, Apache Hive, Apache HBase, Apache Flink, Apache Hudi, or Presto.

In the disclosure, "a pipeline infra" is a managed cluster platform for controlling a data pipeline to be executed. The pipeline infra may include, for example, AWS Elastic MapReduce (EMR), GCP Dataproc, or the like.

In the disclosure, the term "infra provisioning" may include a process of configuring infra so that a data pipeline may be executed by a system.

In the disclosure, "a message queue" is an inter-process communication (IPC) used to process or transmit messages (data) via a network, and may include a system for implementing message-oriented middleware (MOM) in which data is transmitted and received between applications using asynchronous messages. The message queue operates on a first in, first out (FIFO) basis. In FIFO, when data is transmitted from a data source to a message queue, the data is processed in a data sink, and a message process may be added between the data source and the data sink. The message queue may be implemented as an open source message queue including, for example, at least one of RabbitMQ, ActiveMQ, ZeroMQ, Redis, or Apache Kafka.

In the disclosure, "a data broker" includes a message queue implemented with a publish/subscribe model, which is an asynchronous message scheme in a 1:N relationship.

FIG. 1 is a diagram illustrating an operation of a pipeline control server 1000 that controls data transmission through a cloud service providing server 2000 in a network environment, according to an embodiment of the disclosure.

Referring to FIG. 1, the network environment may include the pipeline control server 1000 and the cloud service providing server 2000. The cloud service providing server 2000 may include a server operated by a CSP, and the pipeline control server 1000 may include a server for managing and controlling an execution and/or operation of a data ingestion pipeline 2400 and a data dispersal pipeline 2500 that transmit data through the cloud service providing server 2000. In an embodiment of the disclosure, the pipeline control server 100 may determine a creation and provisioning region of a data broker 2300.

The pipeline control server 100 may include an event detection module 1310, a rule engine 1320, an infra provisioning module 1330, and a pipeline scheduling module 1340. Each of the components included in the pipeline control server 100 may refer to a physical entity unit (a hardware component) or a software or module unit capable of performing an individual function.

The event detection module 1310 may be configured to detect an event occurring in a data source 2100 and a data sink 2200. A data source owner 100 registers the data source 2100 by inputting information about the data source 2100, and the event detection module 1310 may detect the registration event of the data source 2100. Through the registration of the data source 2100, the event detection module 1310 may obtain information including at least one of identification information (user ID) of the data source owner 100, credential information of the data source 2100, a type of the data source 2100, a CSP (for example, AWS, GCP, Microsoft Azure, and On-Premise) in which the data source 2100 is located, a region in which the data source 2100 is located, or an end point of the data source 2100. In an embodiment of the disclosure, the event detection module 1310 may obtain information about the maximum connectable number of data sources 2100.

A data sink user 200 registers the data sink 2200 by inputting information about the data sink 2200, and the event detection module 1310 may detect the registration event of the data sink 2200. In an embodiment of the disclosure, the data sink user 200 may be plural data sink users 200. Through the registration of the data sink 2200, the event detection module 1310 may obtain information about at least one of the number of data sinks 2200, a region in which the data sink 2200 is located, a type of the data sink 2200, credential information of the data sink 2200, or a CSP in which the data sink 2200 is located. In an embodiment of the disclosure, through the registration of the data sink 2200, the event detection module 1310 may obtain at least one of scheduling information about an operation time point of the data ingestion pipeline 2400 and the data dispersal pipeline 2500 or transformation configuration of the data ingestion pipeline 2400 and the data dispersal pipeline 2500.

The event detection module 1310 may transfer, to the rule engine 1320, the obtained information related to the registration of the data source 2100 and the data sink 2200.

The rule engine 1320 may be configured to determine a creation and provisioning region of the data broker 2300 based on the registration information of the data source 2100 and the data sink 2200 received from the event detection module 1310. The rule engine 1320 may compare the maximum connectable number of data sources 2100 with the number of data sinks 2200 and determine whether to create the data broker 2300 based on a result of the comparison. In an embodiment of the disclosure, when the maximum connectable number of data sources 2100 is less than the number of data sinks 2200, the rule engine 1320 may determine to create the data broker 2300.

The rule engine 1320 may identify a region in which the data sink 2200 is gathered by using information about a region in which the data sink 2200 is located, and determine the identified region as a provisioning region of the data broker 2300. When the data sink 2200 is configured in plurality, the rule engine 1320 may determine a region in which the plurality of data sinks 2200 are located as a provisioning region of the data broker 2300. In an embodiment of the disclosure, when the data sink 220 is newly registered in a region other than a region in which a plurality of data sinks 2200 that are pre-registered are located, the rule engine 1320 may determine whether to further create a new data broker in the area in which the new data broker is located, by considering the number of data sinks 2200 that are newly registered, a network cost for transmitting data through the data ingestion pipeline 2400 and the data dispersal pipeline 2500, and an operational cost of the data broker 2300.

The rule engine 1320 may transfer, to the infra provisioning module 1330, information about a creation and provisioning region of the data broker 2300. In an embodiment of the disclosure, the rule engine 1320 may identify whether a pipeline infra for executing the data ingestion pipeline 2400 and the data dispersal pipeline 2500 is provided in the infra provisioning module 1330.

The infra provisioning module 1330 may be configured to provision a pipeline infra for creating or provisioning the data broker 2300 or executing the data ingestion pipeline 2400 and the data dispersal pipeline 2500. In this case, the term "infra provisioning" refers to a process of configuring infra so that a pipeline may be executed by a system. The infra provisioning module 1330 may perform infra provisioning to create the data broker 2300 between the data source 2100 and the data sink 2200, based on the information about the creation of the data broker 2300 received from the rule engine 1320. In an embodiment of the disclosure, the infra provisioning module 1330 may determine a region in which the data broker 2300 is provisioned based on the provisioning region of the data broker 2300 received from the rule engine 1320, and perform infra provisioning so that the data broker 2300 is created in the determined region.

The infra provisioning module 1330 may perform infra provisioning on a data ingestion pipeline 2400 for executing a movement and transformation of data between the data source 2100 and the data broker 2300 and a data dispersal pipeline 2500 for executing a movement or transformation of data between the data broker 2300 and the data sink 2200. The infra provisioning may include a process of executing the data ingestion pipeline 2400 and the data dispersal pipeline 2500 or determining a creation and provisioning region of the data broker 2300.

In an embodiment of the disclosure, the infra provisioning module 1330 may automate infra provisioning on the data ingestion pipeline 2400 and the data dispersal pipeline 2500 by calling an application programming interface (API) for creating, changing, and deleting a pipeline infra (for example, AWS EMR and GCP Dataproc) through a client provided from the cloud service providing server 2000.

The pipeline scheduling module 1340 may be configured to obtain, from the rule engine 1320, scheduling information regarding operation time points of the data ingestion pipeline 2400 and the data dispersal pipeline 2500, and determine and control the operation time points of the data ingestion pipeline 2400 and the data dispersal pipeline 2500 according to the obtained scheduling information. In an embodiment of the disclosure, the scheduling information may include a time batch-based schedule allowing the data ingestion pipeline 2400 and the data dispersal pipeline 2500 to operate at preset time intervals, for example, at an interval of every 1 hour or every 10 minutes. However, the example is not limited thereto, and the scheduling information may include a schedule for controlling an operation time point of the data dispersal pipeline 2500 based on an operation event according to at least one of a time point at which data is extracted from the data source 2100, a transformation time point, or a loading termination time point.

When a single data source 2100 is provided and a plurality of data sinks 2200 are provided, the data source 2100 may be overloaded, and thus, the performance may be deteriorated. In addition, when regions or server locations in which the plurality of data sinks 2200 are located are different from each other, a transmission failure occurs, and a network cost increases. In particular, in a case in which the data sink 2200 is added to a cloud service providing server other than the same cloud service providing server 2000 or other regions, when the data broker 2300 is fixed in position, a network cost increases according to the number of data sinks 2200 added.

The pipeline control server 100 according to an embodiment of the disclosure may create the data broker 2300 including a message queue and determine a provisioning region of the data broker 2300 based on the number of data sinks 2200, a region in which the data sink 2200 is located, a type of the data sink 2200, and the number and distribution of the data ingestion pipeline 2400 and the data dispersal pipeline 2500, and thereby, a network cost may be reduced and the data transmission performance may be improved.

Figure 2:
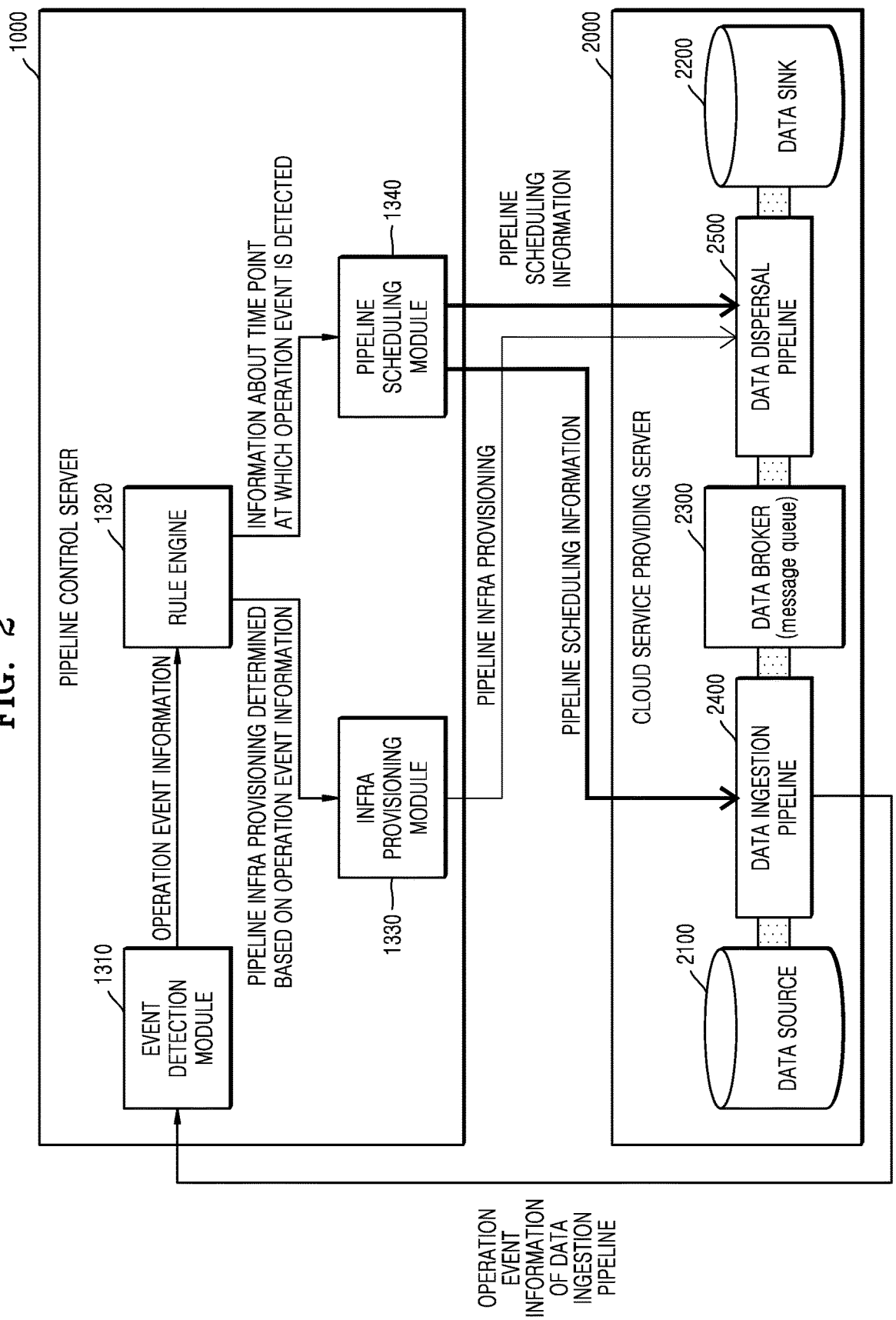
FIG. 2 is a diagram illustrating an operation of a pipeline control server that controls data transmission through a cloud service providing server in a network environment, according to an embodiment of the disclosure.

FIG. 2 is a diagram illustrating an operation of a pipeline control server 1000 for controlling data transmission through a cloud service providing server 2000 in a network environment, according to an embodiment of the disclosure.

Referring to FIG. 2, the network environment may include the pipeline control server 1000 and the cloud service providing server 2000. The cloud service providing server 2000 may include a server operated by a CSP, and the pipeline control server 1000 may include a server for managing and controlling an execution and/or operation of a data ingestion pipeline 2400 and a data dispersal pipeline 2500 for transmitting data through the cloud service providing server 2000. In an embodiment of the disclosure, the pipeline control server 1000 may detect an operation event occurring in the data ingestion pipeline 2400, and perform scheduling for determining an operation time point of the data dispersal pipeline 2500.

The pipeline control server 100 may include an event detection module 1310, a rule engine 1320, an infra provisioning module 1330, and a pipeline scheduling module 1340. Each of the components included in the pipeline control server 100 may refer to a physical entity unit (a hardware component) or a software or module unit capable of performing an individual function.

The event detection module 1310 may be configured to detect an operation event occurring in the data ingestion pipeline 2400. The event detection module 1310 may detect an operation event of the data ingestion pipeline 2400 of extracting, transforming, and loading data from the data source 2100 to the data broker 2300. In an embodiment of the disclosure, the event detection module 1310 may detect an operation event including at least one of an initiation of data extraction, data transformation, or whether data loading is terminated.

The event detection module 1310 may obtain information about the operation event of the data ingestion pipeline 2400. In an embodiment of the disclosure, the event detection module 1310 may obtain at least one of time information regarding a time point of the initiation of data extraction, a time point of data transformation, and a time point of loading termination according to an execution of the data ingestion pipeline 2400 or a data size that is extracted, transformed, and loaded. The event detection module 1310 may transfer the obtained operation event information to the rule engine 1320.

The rule engine 1320 may be configured to receive, from the event detection module 1310, information about an operation event of the data ingestion pipeline 2400, and perform a pipeline infra provisioning for executing the data dispersal pipeline 2500 based on the information about the operation event. In an embodiment of the disclosure, the operation event information includes history information regarding a size of data extracted, transformed, and loaded through the data ingestion pipeline 2400, and the rule engine 1320 may estimate a computing resource size of the data dispersal pipeline 2500 based on the history information regarding the data size. The rule engine 1320 may provision a pipeline infra based on the estimated resource size of the data dispersal pipeline 2500.

The infra provisioning module 1330 may receive, from the rule engine 1320, the pipeline infra provisioning determined based on the operation event, and perform infra provisioning on the data dispersal pipeline 2500. In an embodiment of the disclosure, the infra provisioning module 1330 may automate infra provisioning on the data dispersal pipeline 2500 by calling an application programming interface (API) for creating, changing, and deleting a pipeline infra (for example, AWS EMR and GCP Dataproc) through a client provided from the cloud service providing server 2000.

The pipeline scheduling module 1340 may be configured to obtain, from the rule engine 1320, scheduling information regarding operation time points of the data ingestion pipeline 2400 and the data dispersal pipeline 2500, and to determine and control operation time points of the data ingestion pipeline 2400 and the data dispersal pipeline 2500 according to the obtained scheduling information. In an embodiment of the disclosure, the scheduling information received from the rule engine 1320 by the pipeline scheduling module 1340 may include a schedule for controlling an operation time point of the data dispersal pipeline 2500 based on an operation event of the data ingestion pipeline 2400 according to at least one of a time point at which data is extracted from the data source 2100, a time point at which the data is transformed, or a time point at which a loading of the transformed time point is terminated. In other words, the pipeline scheduling module 1340 may schedule the data dispersal pipeline 2500 to operate according to a time point at which the data ingestion pipeline 2400 operates, thereby synchronizing an operation of the data dispersal pipeline 2500 with an operation of the data ingestion pipeline 2400.

In a case in which data is transmitted from the data source 2100 toward the data sink 2200, when a transmission interval is irregular or the data ingestion pipeline 2400 and the data dispersal pipeline 2500 are executed by streaming, the data ingestion pipeline 2400 and the data dispersal pipeline 2500 are idle during most of the time, and thus, a network cost through the data pipeline is consumed. In addition, when the data ingestion pipeline 2400 and the data dispersal pipeline 2500 are each provided in plurality, a computing resource is required to execute the plurality of data ingestion pipelines 2400 and the plurality of data dispersal pipelines 2500, and thus, in general, operation time points of the data ingestion pipeline 2400 and the data dispersal pipeline 2500 are scheduled by using a time batch scheme. However, in this case, there is a problem in that data extraction, transformation, and loading through the data ingestion pipeline 2400 and the data dispersal pipeline 2500 may not be performed in real time.

The pipeline control server 1000 according to an embodiment of the disclosure detects an operation event of the data ingestion pipeline 2400 and schedules the data dispersal pipeline 2500 to operate according to a time point at which the operation event is detected, and thus, the data dispersal pipeline 2500 is not executed by streaming and is used only for a necessary time. Therefore, use of unnecessary computing resources may be reduced, and real-time performance of the data extraction, transformation, and loading may be guaranteed. In addition, the pipeline control server 1000 of the disclosure may estimate a resource size of the data dispersal pipeline 2500 by using history information accumulated for a size of data extracted, transformed, and loaded through the data ingestion pipeline 2400, thereby reducing an infra cost of the data pipeline.

Figure 3:
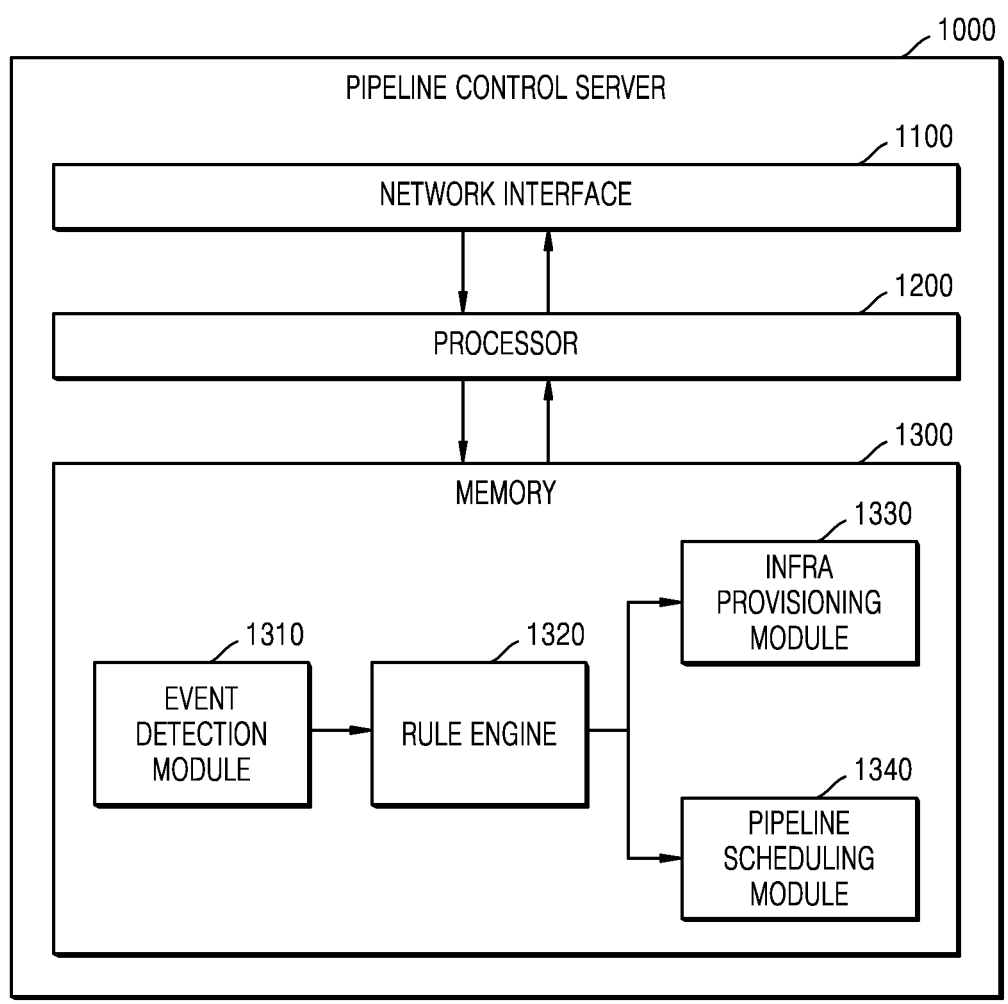
FIG. 3 is a block diagram illustrating components of a pipeline control server according to an embodiment of the disclosure.

FIG. 3 is a block diagram of components of a pipeline control server 1000 according to an embodiment of the disclosure.

Referring to FIG. 3, the pipeline control server 1000 may include a network interface 1100, a processor 1200, and a memory 1300. However, components of the pipeline control server 1000 are not limited to those of the embodiment shown in FIG. 3. For example, the pipeline control server 1000 may include more components than shown or may include less. Furthermore, the network interface 1100, the processor 1200, and the memory 1300 may be implemented in the form of a single chip.

The network interface 1100 may transmit and receive data to and from an external device, for example, a user terminal or an external server. In an embodiment of the disclosure, the network interface 1100 may transmit and receive data to and from the cloud service providing server 2000 (see FIGS. 1 and 2) under the control of the processor 1200. For example, the network interface 1100 may transmit, to the cloud service providing server 200, data related to pipeline infra provisioning instructions of the data ingestion pipeline 2400 and the data dispersal pipeline 2500 (see FIGS. 1 and 2) or data related to infra provisioning instructions of the data broker 2300 (see FIGS. 1 and 2). In addition, the network interface 1100 may transmit, to the cloud service providing server 2000, scheduling information for determining operation time points of the data ingestion pipeline 2400 and the data dispersal pipeline 2500.

The network interface 1100 may include a hardware device that transmits and receives data by using at least one data communication scheme including, for example, a wired local area network (LAN), a wireless LAN, a Wi-Fi, a Wi-Fi Direct (WFD), a Wireless Broadband Internet (Wibro), a World Interoperability for Microwave Access (WiMAX), a Shared Wireless Access Protocol (SWAP), a Wireless Gigabit Alliance (WiGig), and a radio frequency (RF) communication.

The processor 1200 may execute one or more instructions of a program stored in the memory 1300. The processor 1200 may include hardware components that perform arithmetic, logic, and input/output operations and signal processing. The processor 1200 may include at least one of a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), but is not limited thereto.

The memory 1300 may include at least one of a flash memory type, a hard disk type, a multimedia card micro type, a card type memory (e.g., a Secure Digital (SD) or an eXtreme Digital (XD) memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The memory 1300 may store a program including instructions related to a function(s) or operation(s) performed by the processor 1200. The memory 1300 may store at least one of instructions, algorithms, data structures, or program codes that are readable by the processor 1200. The instructions, algorithms, data structures, and program codes stored in the memory 1300 may be implemented in a programming or scripting language such as, for example, C, C++, Java, assembler, or the like.

In an embodiment of the disclosure, the memory 1300 may store software including an operating system (OS), middleware, or an application client.

In the embodiment described below, the processor 1200 may be implemented by executing program instructions or program codes stored in the memory 1300.

The memory 1300 may include an event detection module 1310, a rule engine 1320, an infra provisioning module 1330, and a pipeline scheduling module 1340. A plurality of "modules" included in the memory 1300 refer to a unit for processing a function or operation performed by the processor 1200, and may be implemented with software such as instructions or a program code.

The event detection module 1310 may be configured to detect events occurring in the data source 2100 (see FIGS. 1 and 2) and the data sink 2200 (see FIGS. 1 and 2). The processor 1200 may execute instructions and a program code related to the event detection module 1310, thereby detecting a registration event of the data source 2100 and the data sink 2200. In an embodiment of the disclosure, the processor 1200 may detect a data source registration event in which information about the data source 2100 is input by a data source owner. The processor 1200 may detect the data source registration event and obtain information related to the data source registration. For example, the processor 1200 may obtain information including at least one of identification information (user ID) of the data source owner, credential information of the data source 2100, a type of the data source 2100, a CSP (for example, AWS, GCP, Microsoft Azure, and On-Premise) in which the data source 2100 is located, a region in which the data source 2100 is located, or an end point of the data source 2100. In an embodiment of the disclosure, the processor 1200 may obtain information about the maximum connectable number of data sources 2100.

In an embodiment of the disclosure, the processor 1200 may detect a data sink registration event in which information about the data sink 2200 is input by a data sink user. The processor 1200 may detect the data sink registration event and obtain information related to data sink registration. For example, the processor 1200 may obtain information about at least one of the number of data sinks 2200, a region in which the data sink 2200 is located, a type of the data sink 2200, credential information of the data sink 2200, or a CSP in which the data sink 2200 is located. In an embodiment of the disclosure, through the registration of the data sink 2200, the processor 1200 may also obtain information about at least one of scheduling information regarding operation time points of the data ingestion pipeline 2400 (see FIGS. 1 and 2) and the data dispersal pipeline 2500 (see FIGS. 1 and 2) of the cloud service providing server 2000 (see FIGS. 1 and 2) or transformation configuration of the data ingestion pipeline 2400 and the data dispersal pipeline 2500.

In an embodiment of the disclosure, the processor 1200 may execute instructions or program code related to the event detection module 1310, thereby detecting a state change of the data sink 2200. In an embodiment of the disclosure, even in the absence of a registration procedure of a data sink user, the processor 1200 may detect a state of the data sink 2200 according to a predetermined time interval and detect a state change related to a creation and location movement of the data sink 2200. The processor 1200 may obtain information of the data sink 2200 as the state change of the data sink 2200 is detected. A detailed embodiment in which the processor 1200 detects a state change of the data sink 2200 and obtains information of the data sink 2200 at a time point at which the state change is detected will be described in detail later below with reference to FIG. 9.

In an embodiment of the disclosure, the processor 1200 executes instructions or program code related to the event detection module 1310, thereby detecting an operation event of the data ingestion pipeline 2400 (see FIGS. 1 and 2) for moving and transforming data between the data source 2100 and the data broker 2300 (see FIGS. 1 and 2). In an embodiment of the disclosure, the processor 1200 may detect an operation event related to the execution of the data ingestion pipeline 2400 and obtain time information regarding a time point of an initiation of data extraction according to the execution of the data ingestion pipeline 2400, a time point at which the extracted data is transformed, and a time point at which a loading of the transformed data is terminated, and a size of data that is extracted, transformed, and loaded.

The rule engine 1320 may be configured to make a decision according to a preset rule based on a degree of an event received from the event detection module 1310. In an embodiment of the disclosure, the rule engine 1320 may determine a creation and provisioning region of the data broker 2300 based on event information related to registration of the data source 2100 and the data sink 2200. In an embodiment of the disclosure, by executing instructions or program code related to the rule engine 1320, the processor 1200 may obtain information about the maximum connectable number of data sources 2100 included in the registration event information of the data source 2100, compare the maximum connectable number of data sources 2100 with the number of data sinks 2200, and determine whether to create the data broker 2300, based on the comparison result. In an embodiment of the disclosure, when the maximum connectable number of data sources 2100 is less than the number of data sinks 2200, the processor 1200 may determine to create the data broker 2300.

The processor 1200 may identify a region in which the data sink 2200 is gathered by using region information included in the event information of the data sink 2200, and determine the identified region as a provisioning region of the data broker 2300. When the data sink 2200 is configured in plurality, the processor 1200 may determine a region in which the plurality of data sinks 2200 are located as a provisioning region of the data broker 2300. In an embodiment of the disclosure, when the data sink 2200 is newly registered in a region other than a region in which a plurality of the data sinks 2200 that are pre-registered are located, the processor 120 may determine whether to additionally create a new data broker in the region in which the data sink 2200 that is newly registered is located by considering the number of data sinks 2200 that are newly registered, a network cost of transmitting data through the data ingestion pipeline 2400 and the data dispersal pipeline 2500, and an operational cost of the data broker 2300. A detailed embodiment related to determination of a creation and provisioning region of a new data broker is described in detail with reference to FIGS. 5A to 7.

The processor 1200 may execute instructions or program code related to the rule engine 1320, thereby obtaining information about an operation event of the data ingestion pipeline 2400. In an embodiment of the disclosure, the operation event information may include information about a time point of an initiation of data extraction, a time point at which the extracted data is transformed, and a time point at which a loading of the transformed data is loaded, through the data ingestion pipeline 2400. In an embodiment of the disclosure, the operation event information may include history information regarding a size of data extracted, transformed, and loaded through the data ingestion pipeline 2400.

The infra provisioning module 1330 may be configured to create or provision the data broker 2300 or to provide a pipeline infra for executing the data ingestion pipeline 2400 and the data dispersal pipeline 2500. The "infra provisioning" may include a process of configuring an infra including the data ingestion pipeline 2400 and the data dispersal pipeline 2500 and/or the data broker 2300. The infra provisioning may include a process of executing the data ingestion pipeline 2400 and the data dispersal pipeline 2500 or determining a creation or provisioning region of the data broker 2300.

The processor 1200 may execute instructions or program code related to the infra provisioning module 1330, thereby performing infra provisioning to create the data broker 2300 between the data source 2100 and the data sink 2200. In an embodiment of the disclosure, the processor 1200 may determine a region in which the data broker 2300 is provisioned based on the information about the provisioning region of the data broker 2300 obtained through the rule engine 1320, and perform infra provisioning to create the data broker 2300 in the determined region.

In an embodiment of the disclosure, the processor 1200 may automate infra provisioning with respect to the data ingestion pipeline 2400 and the data dispersal pipeline 2500 by calling an application programming interface (API) for creating, changing, and deleting a pipeline infra (for example, AWS EMR and GCP Dataproc) through a client provided from the cloud service providing server 2000 (see FIGS. 1 and 2).

In an embodiment of the disclosure, the processor 1200 may provision a pipeline infra of the data dispersal pipeline 2500 based on the operation event information of the data ingestion pipeline 2400. In an embodiment of the disclosure, the operation event information may include history information of at least one of a size of data extracted, transformed, and loaded through the data ingestion pipeline 2400 or an execution time point of the data ingestion pipeline 2400, and the processor 1200 may estimate a computing resource size of the data dispersal pipeline 2500 based on the history information. The processor 1200 may provision the pipeline infra based on the estimated resource size of the data dispersal pipeline 2500. A detailed embodiment in which the processor 1200 provisions the pipeline infra of the data dispersal pipeline 2500 based on the history information related to data transmission of the data ingestion pipeline 2400 is described in detail with reference to FIG. 11.

The pipeline scheduling module 1340 may be configured to obtain scheduling information regarding operation time points of the data ingestion pipeline 2400 and the data dispersal pipeline 2500, and to control operation time points of the data ingestion pipeline 2400 and the data dispersal pipeline 2500 according to the obtained scheduling information. The processor 1200 may execute instructions or program code related to the pipeline scheduling module 1340, to thereby control the data ingestion pipeline 2400 and the data dispersal pipeline 2500 to operate at preset time intervals (for example, at an interval of every 1 hour or every 10 minutes). However, the example is not limited thereto, and the processor 1200 may obtain, by using the event detection module 1310, operation event information regarding an operation time point of the data ingestion pipeline 2400, that is, at least one of a time point at which data is extracted from the data source 2100 through the data ingestion pipeline 2400, a time point at which the extracted data is transformed, or a time point of a loading of the transformed data is terminated, and control an operation time point of the data dispersal pipeline 2500 based on the obtained operation event information.

Figure 4:
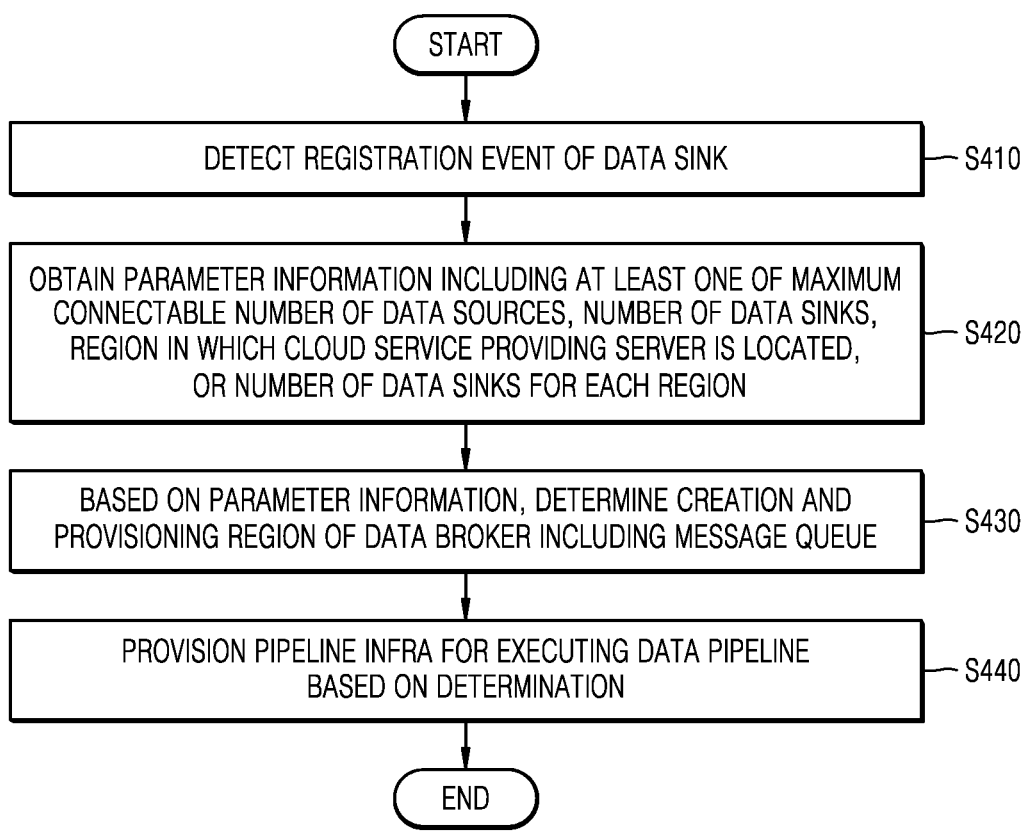
FIG. 4 is a flowchart of an operation method of a pipeline control server according to an embodiment of the disclosure.

FIG. 4 is a flowchart of an operation method of a pipeline control server 1000, according to an embodiment of the disclosure.

At operation S410, the pipeline control server 1000 detects a registration event of a data sink. The pipeline control server 1000 may detect a data sink registration event in which information about the data sink 2200 (see FIG. 1) is input by a user of the data sink 2200 for receiving data from the data source 2100 (see FIG. 1) in the cloud service providing server 2000 (see FIG. 1). In an embodiment of the disclosure, the registration of the data sink 2200 may be performed by inputting information related to the data sink 2200 through a dashboard by a user of the data sink 2200.

The pipeline control server 1000 may detect a registration event of the data source 2100, at operation S410. Similar to the data sink 2200, a registration event of the data source 2100 may also be performed when an owner of the data source 2100 inputs information related to the data source 2100 through the dashboard.

At operation S420, the pipeline control server 1000 obtains parameter information including at least one of a maximum connectable number of data sources 2100, a number of data sinks 2200, a region in which the cloud service providing server 2000 is located, or a number of data sinks 2200 for each region. In an embodiment of the disclosure, the pipeline control server 1000 may obtain parameter information related to data sink registration as a data sink registration event is detected.

The pipeline control server 1000 may obtain parameter information related to registration of the data source 2100 as a data source registration event is detected. The parameter information related to the data source registration may include, for example, information about at least one of identification information (user ID) of a data source owner, credential information of the data source 2100, a type of the data source 2100, a CSP (for example, AWS, GCP, Microsoft Azure, and On-Premise) in which the data source 2100 is located, a region in which the data source 2100 is located, or an end point of the data source 2100. In an embodiment of the disclosure, the pipeline control server 1000 may obtain information about the maximum connectable number of data sources 2100.

In an embodiment of the disclosure, through the registration of the data sink 2200, the pipeline control server 1000 may obtain information about at least one of scheduling information regarding operation time points of the data ingestion pipeline 2400 (see FIG. 1) and the data dispersal pipeline 2500 (see FIG. 1) of the cloud service providing server 2000 or transformation configuration of the data ingestion pipeline 2400 and the data dispersal pipeline 2500.

At operation S430, based on the parameter information, the pipeline control server 1000 determines a creation and provisioning region of a data broker including a message queue. The pipeline control server 1000 may compare the maximum connectable number of data sources 2100 included in the parameter information obtained at operation S420 with the number of data sinks 2200, and determine whether to create a data broker based on the comparison result. The pipeline control server 1000 may identify a region in which the data sink 2200 is gathered by using region information of the data sink 2200 included in the parameter information related to the data sink 2200, and determine the identified region as a provisioning region of the data broker. When a plurality of data sinks 2200 are provided, the pipeline control server 1000 may determine a region in which the plurality of data sinks 2200 are located, as a provisioning region of the data broker.

At operation S440, based on the determination, the pipeline control server 1000 may provision a pipeline infra for executing a data pipeline. The term "infra provisioning" may include a process of configuring an infra including a data pipeline and/or a data broker. The pipeline control server 1000 may perform infra provisioning to create a data broker between the data source 2100 and the data sink 2200. In an embodiment of the disclosure, the pipeline control server 1000 may perform infra provisioning to create a data broker in the provisioning region of the data broker determined at operation S430.

In an embodiment of the disclosure, the pipeline control server 1000 may automate pipeline infra provisioning by calling an API for creating, changing, and deleting a pipeline infra (for example, AWS EMR and GCP Dataproc) through a client provided from the cloud service providing server 2000. In an embodiment of the disclosure, the pipeline control server 1000 may provision an infra of a data ingestion pipeline between the data source 2100 and a data broker, and provision an infra of a data dispersal pipeline between the data broker and the data sink 2200.

In an embodiment of the disclosure, before provisioning the pipeline infra, the pipeline control server 1000 may identify whether the pipeline infra for executing the data pipeline is provisioned in the cloud service providing server 2000. When the data pipeline infra has already been provisioned in the cloud service providing server 2000, the pipeline control server 1000 may not perform an additional pipeline infra provisioning.

Figure 5A:
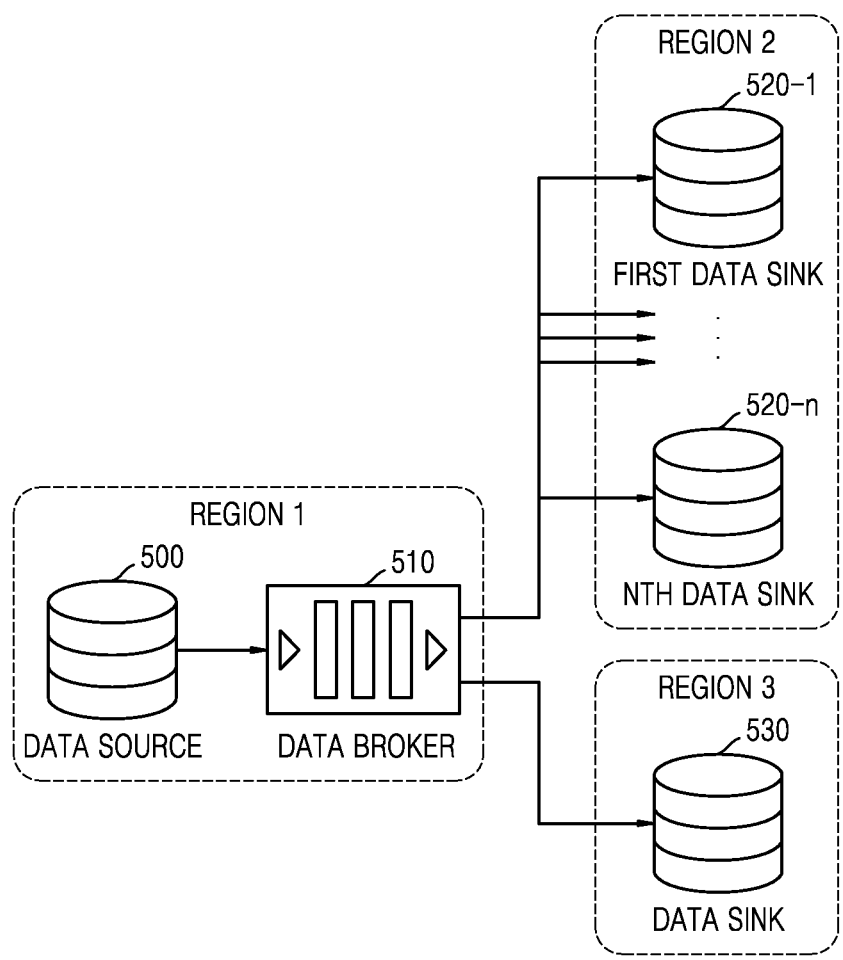
FIG. 5A is a diagram illustrating an embodiment in which a data source and a plurality of data sinks are located in different regions from each other.

FIG. 5A is a diagram illustrating an embodiment in which a data source 500 and a plurality of data sinks 520-1 to 520-*n* and 530 are located in different regions.

Referring to FIG. 5A, the data source 500 and a data broker 510 may be located in a first region (region 1), and the plurality of data sinks 520-1 to 520-*n* and 530 may located in a second region (region 2) and a third region (region 3), respectively. In this case, the first region, the second region, and the third region may be locations that are apart from one another in terms of a geographical and/or network environment. For example, the first region may include a partial region of the U.S., the second region may include a partial region of Europe, and the third region may include a partial region of the Republic of Korea. The plurality of data sinks 520-1 to 520-*n* may be gathered in the second region, and the other data sink 530 may be located in the third region.

In a system in which data is transmitted from the data source 500 to a data sink, when the number of data sinks increases from the addition or new registration of a data sink, the data source 500 may be overloaded. Thus, in order to guarantee that data is transmitted in real time, a data pipeline including the data broker 510 may be established. In a system in which data is transmitted by using a data pipeline including the data broker 510, in a case in which a data sink is added to or newly registered in a region other than a region in which the data broker 510 is located, when a position of the data broker 510 is fixed, a network cost increases every time a data sink is added.

As shown in FIG. 5A, in a case in which the data source 500 and the data broker 510 are located in the first region and the data broker 510 is fixed, when the plurality of data sinks 520-1 to 520-*n* are added or newly registered in the second region, in order to transmit data to the second region via the data broker 510, a network cost that may be paid to a cloud service providing server of the second region may increase. In an embodiment of the disclosure, a network cost problem may be resolved by provisioning an additional data broker in the second region in which the plurality of data sinks 520-1 to 520-*n* are located. This will be described below with reference to FIG. 5B.

Figure 5B:
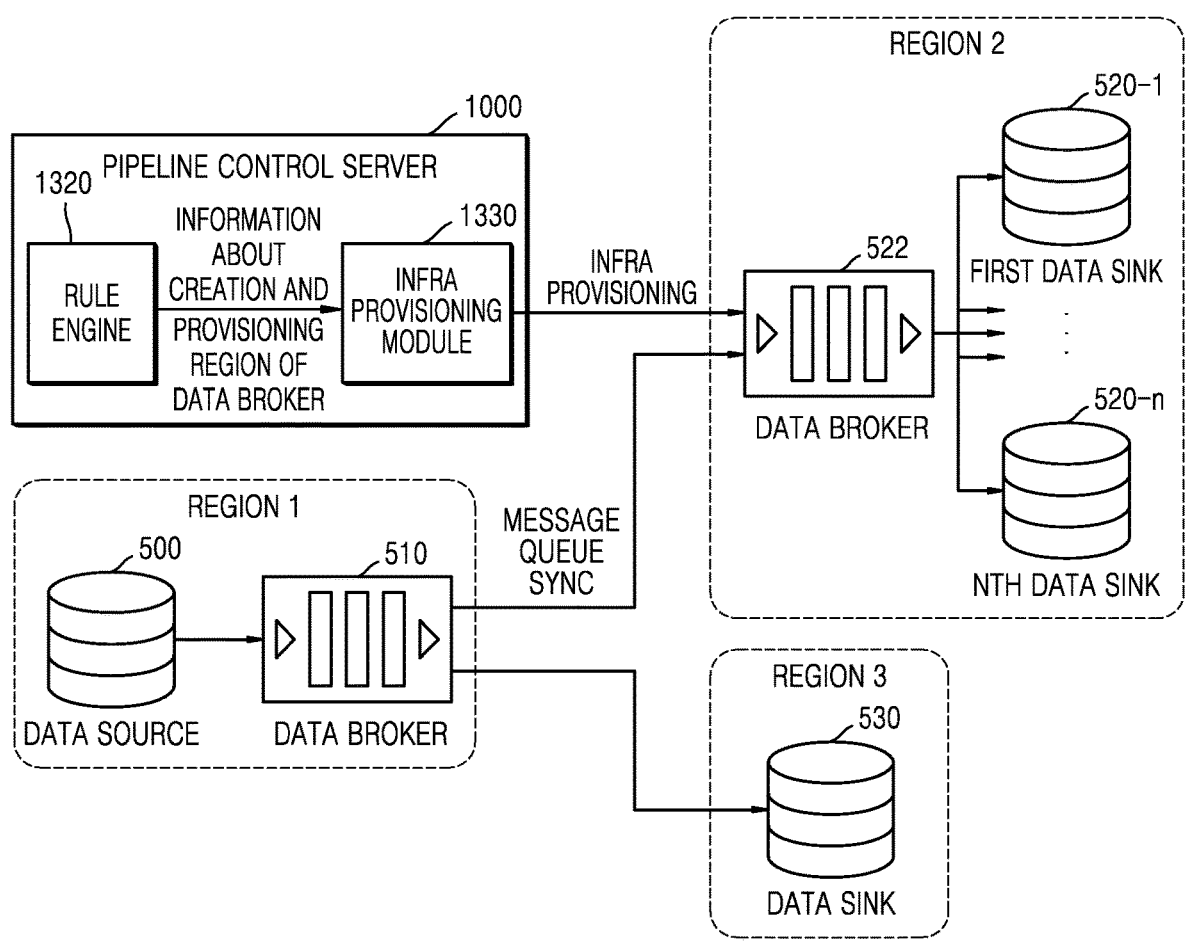
FIG. 5B is a diagram illustrating an embodiment in which a pipeline control server creates and/or arranges a data broker in a region in which the plurality of data sinks are located.

FIG. 5B is a diagram illustrating an embodiment in which the pipeline control server 1000 creates and/or disposes a data broker 522 in a region in which the plurality of data sinks 520-1 to 520-*n* are located or a region in which the data sink 530 is located.

The rule engine 1320 of the pipeline control server 1000 may determine whether to additionally create the data broker 522 and a provisioning region based on parameter information according to a registration event of the plurality of data sinks 520-1 to 520-*n* and 530, for example, information about at least one of the number of data sinks, a region in which the data sink is located, a cloud service providing server in which the data sink is located. In the embodiment shown in FIG. 5B, the rule engine 1320 may obtain information about the second region in which the plurality of data sinks 520-1 to 520-*n* are gathered, and determine to additionally provision the data broker 522 in the second region.

The rule engine 1320 may provide, to the infra provisioning module 1330, the information about the creation and provisioning region of the data broker 522. The infra provisioning module 1330 may perform infra provisioning to create the data broker 522 in a cloud service providing server of the plurality of data sinks 520-1 to 520-*n* located in the second region. The data broker 510 located in the first region may perform a message queue synchronization with the data broker 510 added to the second region.

In the embodiment shown in FIG. 5B, the pipeline control server 1000 may additionally create and dispose the data broker 522 in the second region in which the plurality of data sinks 520-1 to 520-*n* are located, thereby reducing a network cost and guaranteeing a real-time data transmission. The pipeline control server 1000 may not create and provision a data broker in the third region in which only one data sink 530 is located so as to prevent a computing resource cost from being inefficiently used. This is because when a data broker is created despite a small number of data sinks (i.e., one data sink 530), an operational cost of a data broker and an operational cost of a pipeline are further consumed.

In other words, the pipeline control server 1000 of the disclosure may determine whether to create and provision a data broker, based on the number and locations of the plurality of data sinks 520-1 to 520-*n* and 530. An operation method of the pipeline control server 1000 related to the above will be described in detail below with reference to FIGS. 6 and 7.

Figure 6:
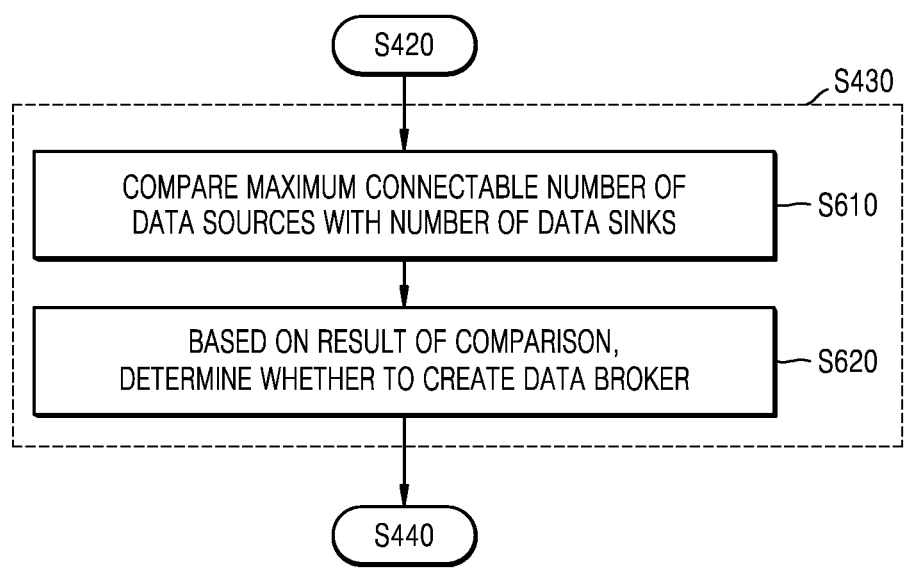
FIG. 6 is a flowchart of a method of determining, by a pipeline control server, a creation and provisioning region of a data broker, according to an embodiment of the disclosure.

FIG. 6 is a flowchart of a method of determining, by the pipeline control server 1000, a creation and provisioning region of the data broker, according to an embodiment of the disclosure.

Operations S610 and S620 shown in FIG. 6 are included in operation S430 shown in FIG. 4. Operation S610 is performed after operation S420 shown in FIG. 4. Operation S620 is followed by operation S440 shown in FIG. 4.

At operation S610, the pipeline control server 1000 compares a maximum connectable number of data sources with the number of data sinks. Information about the maximum connectable number of data sources may be obtained by detecting a registration event of a data source, and the number of data sinks may be obtained by detecting a registration event of a data sink.

At operation S620, the pipeline control server 1000 may determine whether to create a data broker, based on a result of the comparison. In an embodiment of the disclosure, as the result of the comparison, when the number of data sinks is greater than the maximum connectable number of data sources, the pipeline control server 1000 determines to create a data broker. In this case, the pipeline control server 1000 may perform infra provisioning to create a data broker in a cloud service providing server in which the data sink is located.

Figure 7:
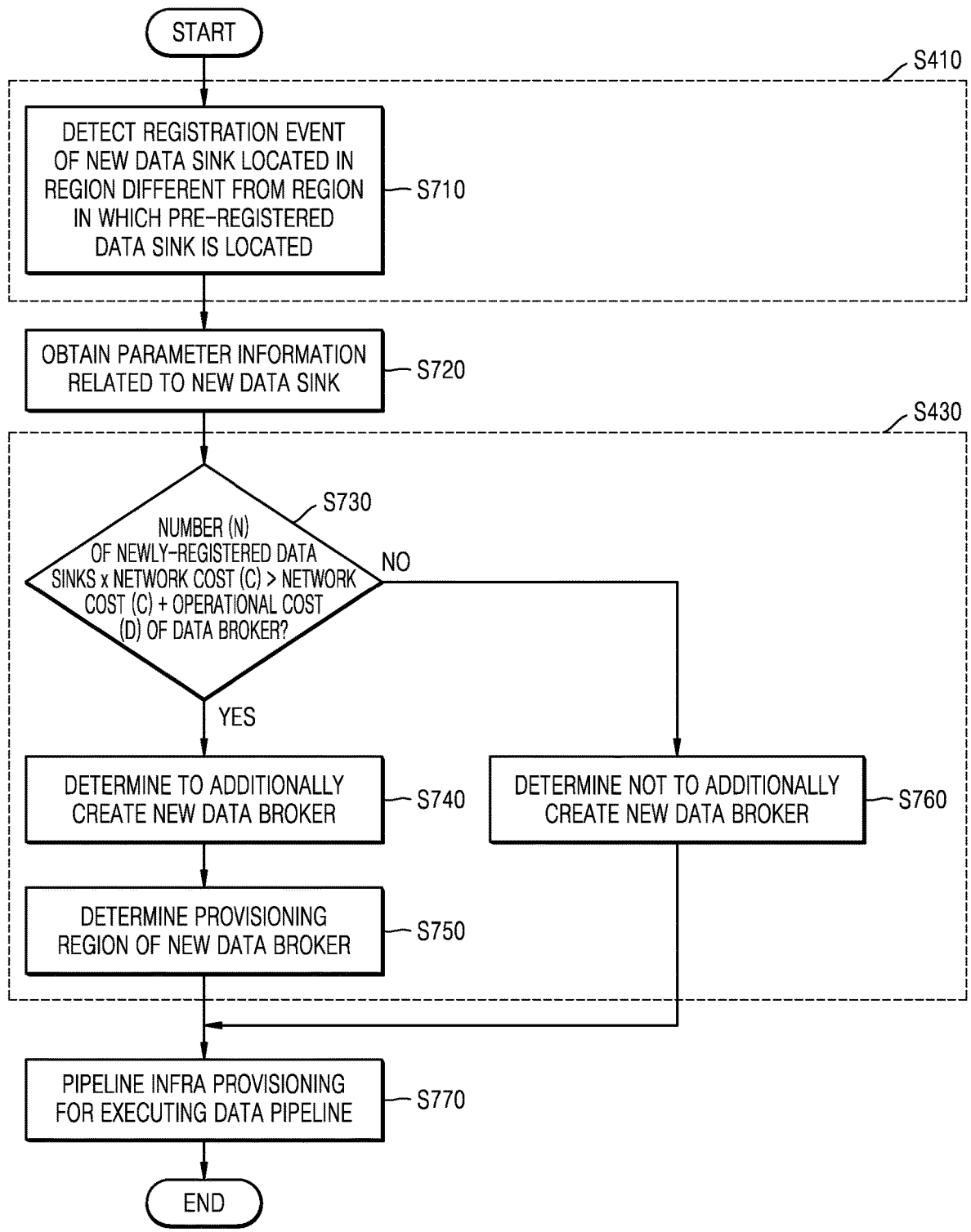
FIG. 7 is a flowchart of a method of determining, by a pipeline control server, a creation and provisioning region of a data broker, according to an embodiment of the disclosure.

FIG. 7 is a flowchart of a method of determining, by the pipeline control server 1000, a creation and provisioning region of a data broker, according to an embodiment of the disclosure.

Operation S710 shown in FIG. 7 is included in operation S410 shown in FIG. 4. Operations S730 and S760 shown in FIG. 7 are included operation S430 shown in FIG. 4.

At operation S710, the pipeline control server 1000 detects a registration event of a new data sink located in a region different from a region in which a pre-registered data sink is located. The new data sink may be located within a cloud service providing server of a region different from a region in which the pre-registered data sink is located.

At operation S720, the pipeline control server 1000 obtains parameter information related to the new data sink. As a registration event of the new data sink is detected, the pipeline control server 1000 may obtain information about at least one of the number of new data sinks, a region of a cloud service providing server in which the new data sink is located, or the number of new data sinks for each region. In an embodiment of the disclosure, the pipeline control server 1000 may also obtain information about a network cost consumed when data is transmitted to a cloud service providing server in which the new data sink is located.

At operation S730, the pipeline control server 1000 determines whether a total sum (N×C) of a network cost (C) according to the number (N) of newly-registered data sinks exceeds a sum of the network cost (C) and an operational cost (D) of a data broker. The pipeline control server 1000 may perform an operation of multiplying the number (N) of the new data sinks by the network cost (C) consumed when data is transmitted through a data pipeline, thereby obtaining a total network cost (N×C) for the new data sink. The pipeline control server 1000 may compare the obtained total network cost (N×C) with a sum of the operational cost (D) of the data broker and the network cost (C) when data is transmitted through a data pipeline connected to the data broker.

As a result of comparison, when it is determined that the total network cost (N×C) for the new data sink is greater than the sum of the operational cost (D) of the data broker and the network cost (C) (at operation S740), the pipeline control server 1000 may determine to additionally create a new data broker.

At operation S750, the pipeline control server 1000 determines a provisioning region of the new data broker. In an embodiment of the disclosure, the pipeline control server 1000 may identify a region in which one or more new data brokers are gathered, from the parameter information related to the new data sink obtained at operation S720, and determine the identified region as a location at which the new data broker is to be provisioned. The pipeline control server 1000 may determine to create the new data broker in a cloud service providing server located in the determined region.

As a result of the comparison in operation S730, when it is determined that the total network cost (N×C) for the new data sink is less than the sum of the operational cost (D) of the data broker and the network cost (C) at operation S760, the pipeline control server 1000 may determine not to additionally create a new data broker.

At operation S770, the pipeline control server 1000 performs a pipeline infra provisioning for executing a data pipeline. The pipeline control server 1000 may perform infra provisioning on a cloud service providing server of a new data sink to create a new data broker in the determined region. In this case, a previous data broker located in the same cloud service providing server as the data source may perform a message queue synchronization with the new data broker.

Figure 8:
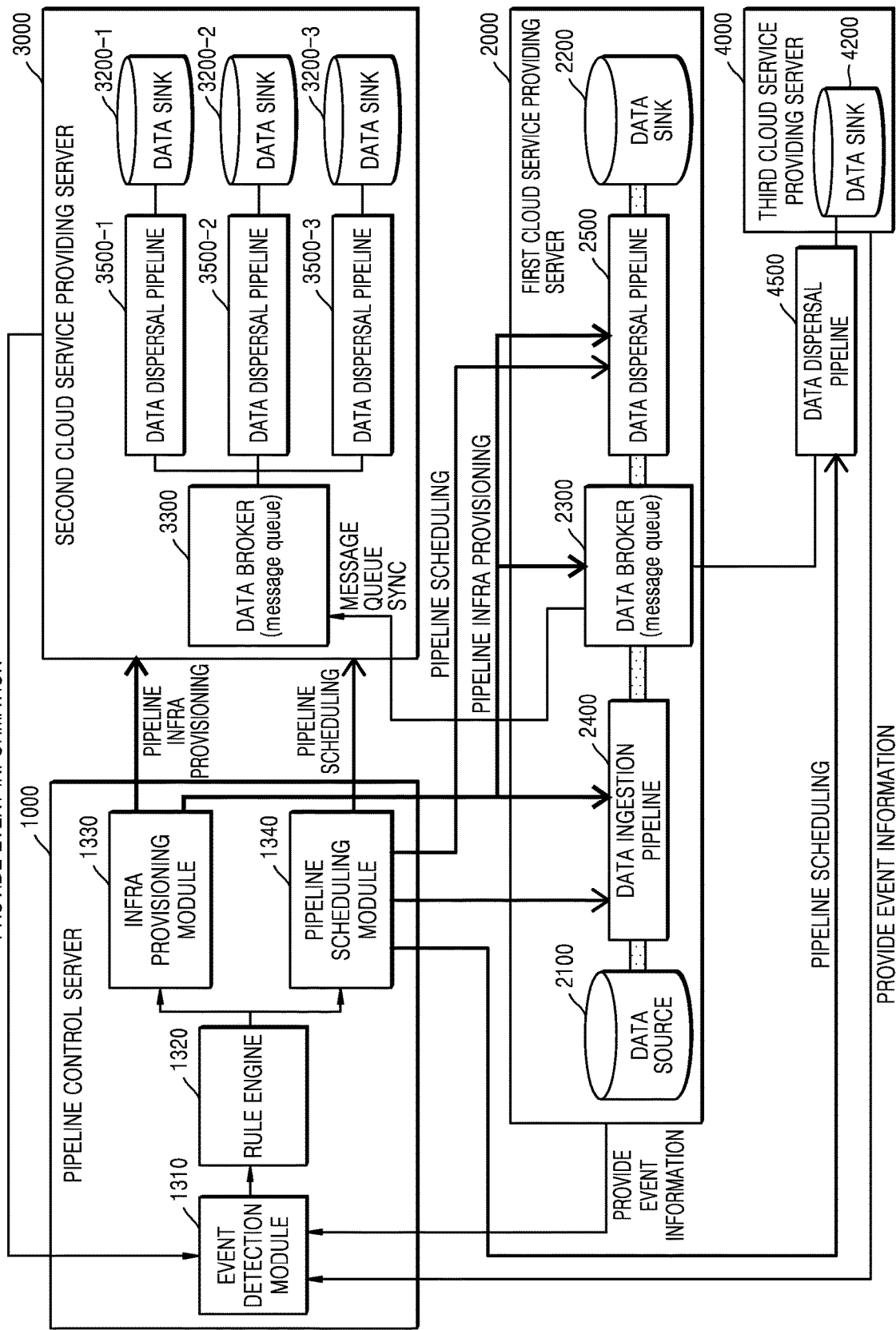
FIG. 8 is a diagram illustrating a configuration and operation method of a pipeline control server and a plurality of cloud service providing servers, according to an embodiment of the disclosure.

FIG. 8 is a diagram illustrating a configuration and operation method of a pipeline control server 1000 and a plurality of cloud service providing servers, for example, first, second, and third cloud service providing servers 2000, 3000, and 4000, according to an embodiment of the disclosure.

The pipeline control server 1000 and the first cloud service providing server 2000 are respectively the same as the pipeline control server 1000 and the cloud service providing server 2000 shown in FIGS. 1 and 2, and redundant descriptions thereof are omitted.

In the embodiment shown in FIG. 8, the first cloud service providing server 2000, the second cloud service providing server 3000, and the third cloud service providing server 4000 may be located in different regions from one another. For example, the first cloud service providing server 2000 may be located in a partial region of the U.S., the second cloud service providing server 3000 may be located in a partial region of Europe, and the third cloud service providing server 4000 may be located in a partial region of the Republic of Korea.

The first cloud service providing server 2000, the second cloud service providing server 3000, and the third cloud service providing server 4000 may be provided by different manufacturers from one another. For example, the first cloud service providing server 2000 may be manufactured by AWS, the second cloud service providing server 3000 may be manufactured by GCP, and the third cloud service providing server 4000 may be manufactured by On-Premise. However, this is only an example, and the cloud service providing server is not limited to the CSPs listed above.

The pipeline control server 1000 may obtain event information related to the data source 2100 and the data sink 2200 of the first cloud service providing server 2000, determine a creation and provision of the data broker 2300 based on the event information, perform infra provisioning on the data ingestion pipeline 2400 and the data dispersal pipeline 2500, and schedule an execution time point of the data ingestion pipeline 2400 and the data dispersal pipeline 2500.

When a plurality of data sinks 3200-1, 3200-2, and 3200-3 located in the second region is added or newly registered, the plurality of data sinks 3200-1, 3200-2, and 3200-3 may obtain event information related to data sink registration from the second cloud service providing server 3000 and provision a pipeline infra for creating and provisioning a data broker 3300 and executing a plurality of data dispersal pipelines 3500-1, 3500-2, and 3500-3. In an embodiment of the disclosure, a rule engine 1320 of the pipeline control server 1000 may obtain information about a region (e.g., the second region) in which the plurality of data sinks 3200-1, 3200-2, and 3200-3 are gathered and the second cloud service providing server 3000, based on the event information related to the data sink registration obtained from the event detection module 1310, and determine to create and provision the data broker 3300 in the second cloud service providing server 3000. The infra provisioning module 1330 of the pipeline control server 1000 may perform infra provisioning to create the data broker 3300 in the second cloud service providing server 3000, based on the determination of the rule engine 1320. In this case, the data broker 2300 located in the first cloud service providing server 2000 may perform a message queue synchronization with the data broker 3300 that is newly created. The pipeline scheduling module 1340 of the pipeline control server 1000 may schedule operation time points of the data dispersal pipelines 3500-1, 3500-2, and 3500-3 between the new data broker 3300 and the plurality of data sinks 3200-1, 3200-2, and 3200-3 according to a time point at which operation event information related to extraction, transformation, and loading through the data ingestion pipeline 2400 of the cloud service providing server 2000 is detected.

The third cloud service providing server 4000 may include only one data sink 4200. The data sink 4200 may receive data from the data sink 4200 of the first cloud service providing server 2000 via a data dispersal pipeline 4500. The pipeline scheduling module 1340 of the pipeline control server 1000 may schedule an operation time point of the data dispersal pipeline 4500 according to a time point at which operation event information related to extraction, transformation, and loading through the data ingestion pipeline 2400 of the cloud service providing server 2000 is detected.

In the embodiment shown in FIG. 8, the pipeline control server 1000 may create and dispose the data broker 3300 in the second cloud service providing server 3000 at which the plurality of data sinks 3200-1, 3200-2, and 3200-3 are located, to thereby reduce a network cost and guarantee a real time data transmission. The pipeline control server 1000 may not create and provision a data broker in the third cloud service providing server 4000 in which only one data sink 4200 is located, thereby reducing an operational cost of the data broker and efficiently using a computing resource cost.

Figure 9:
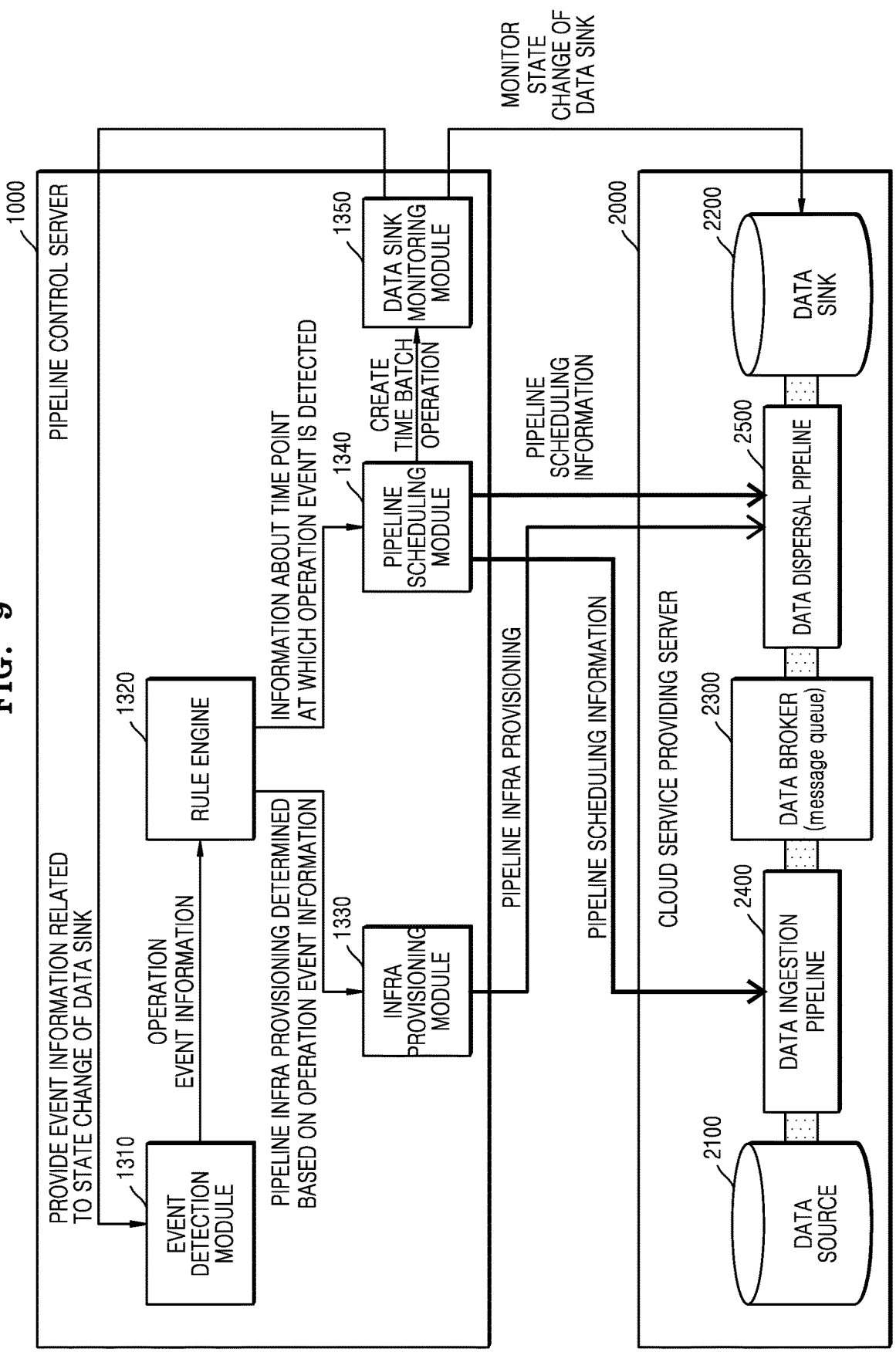
FIG. 9 is a diagram illustrating an operation of a pipeline control server that controls data transmission through a cloud service providing server in a network environment, according to an embodiment of the disclosure.

FIG. 9 is a diagram illustrating an operation of a pipeline control server 1000 for controlling data transmission through a cloud service providing server 2000 in a network environment, according to an embodiment of the disclosure.

The cloud service providing server 2000 shown in FIG. 9 is the same as the cloud service providing server 2000 shown in FIGS. 1 and 2, and redundant descriptions thereof are omitted. The pipeline control server 1000 shown in FIG. 9 is the same as the pipeline control server 1000 shown in FIG. 2 except that the former further includes a data sink monitoring module 1350, and redundant descriptions thereof are omitted. A function and/or operation of the data sink monitoring module 1350 are mainly described below.

The data sink monitoring module 1350 may be configured to detect a state change of the data sink 2200 included in the cloud service providing server 2000, and provide information on the state change of the data sink 2200 to the event detection module 1310. In an embodiment of the disclosure, the data sink monitoring module 1350 may detect a state change regarding at least one of a region in which the data sink 2200 is located, a type of the data sink 2200, credential information of the data sink 2200, or a CSP in which the data sink 2200 is located. In an embodiment of the disclosure, the data sink monitoring module 1350 may also detect an additional creation of the data sink 2200.

The data sink monitoring module 1350 may detect a state change of the data sink monitoring module 1350 according to a preset time interval. In an embodiment of the disclosure, the pipeline scheduling module 1340 may create a time batch job according to a specific time interval and provide information about the generated time batch job to the data sink monitoring module 1350. The data sink monitoring module 1350 may obtain information about the time interval from the time batch job information received from the pipeline scheduling module 1340. The time batch job may be determined, for example, every 30 minutes or every 1 hour, but is not limited thereto.

The data sink monitoring module 1350 provides event information related to the state change of the data sink 2200 to the event detection module 1310.

The event detection module 1310 obtains event information related to the state change of the data sink 2200 and provides the event information to the rule engine 1320. A function and/or operations after the rule engine 1320 obtains the event information and functions and/or operations of the infra provisioning module 1330 and the pipeline scheduling module 1340 are the same as the description with reference to FIG. 2, and redundant descriptions thereof are omitted.

In the embodiment shown in FIG. 9, the pipeline control server 1000 may monitor the state change of the data sink 2200 despite the absence of a registration process of the data sink 2200 of a data sink user and perform scheduling of the data ingestion pipeline 2400 according to a time point at which a state change of the data sink 2200 is detected. Thus, the pipeline control server 1000 of the disclosure allows only a necessary time to be used without executing the data dispersal pipeline 2500 by streaming, thereby reducing use of unnecessary computing resources and guaranteeing real-time performance.

Figure 10:
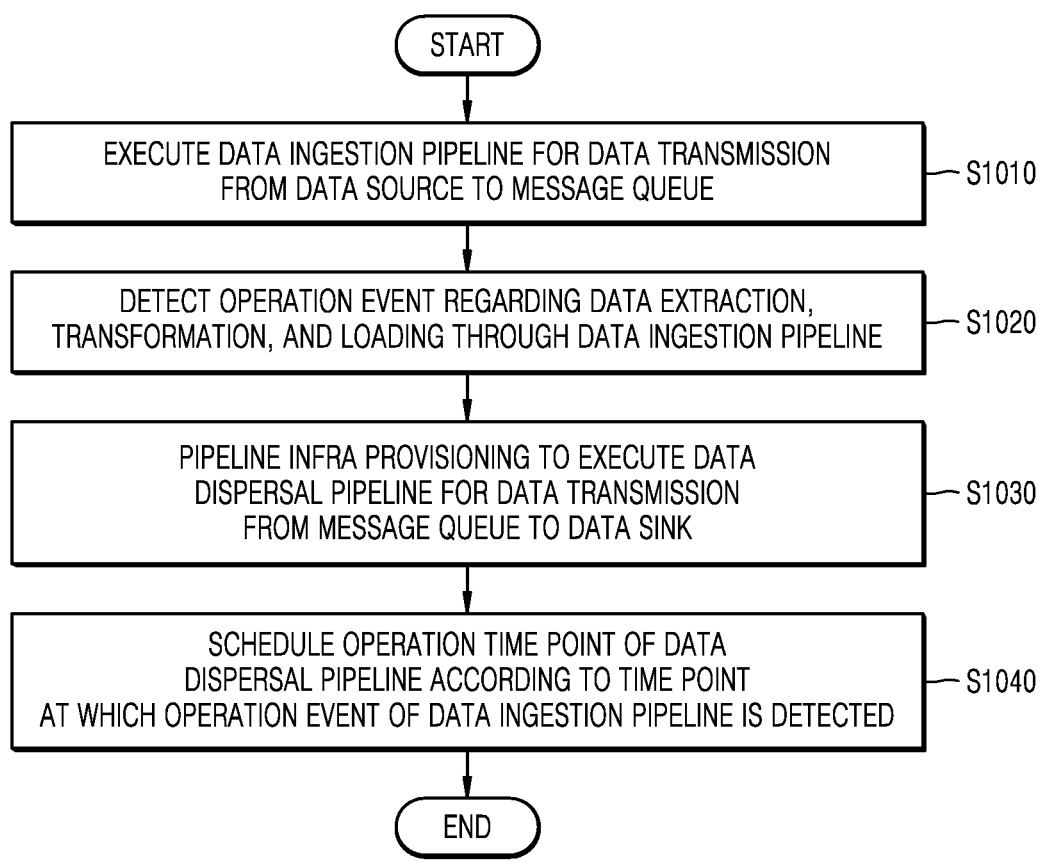
FIG. 10 is a flowchart of an operation method of a pipeline control server according to an embodiment of the disclosure.

FIG. 10 is a flowchart of an operation method of a pipeline control server 1000 according to an embodiment of the disclosure.

At operation S1010, a cloud service providing server executes a data ingestion pipeline for transmitting data from a data source to a message queue. In this case, "a message queue" may include a system implementing message-oriented middleware (MOM) that transmits and receives data between applications by using a asynchronous message. In an embodiment of the disclosure, the message queue may be implemented with a data broker.

At operation S1020, the pipeline control server 1000 detects an operation event related to extraction, transformation, and loading through a data ingestion pipeline. The pipeline control server 1000 may detect an operation event including at least one of an initiation of data extraction by the data ingestion pipeline, transformation of the extracted data, or whether a loading of the transformed data is terminated.

The pipeline control server 1000 may obtain information related to the operation event of the data ingestion pipeline. In an embodiment of the disclosure, the pipeline control server 1000 may obtain time information related to at least one of a time point at which the data ingestion pipeline extracts data, a time point at which the extracted data is transformed, or a time point at which a loading of the transformed data is terminated. In an embodiment of the disclosure, the pipeline control server 1000 may obtain information about a total data size of data extracted, transformed, and loaded through the data ingestion pipeline.

At operation S1030, the pipeline control server 1000 performs a pipeline infra provisioning to execute a data dispersal pipeline for data transmission from the message queue to the data sink. In an embodiment of the disclosure, the pipeline control server 1000 may receive information about the pipeline infra provisioning determined based on the information about the operation event obtained at operation S1020, and perform an infra provisioning for executing the data dispersal pipeline. In an embodiment of the disclosure, the pipeline control server 1000 may automate infra provisioning performed on the data dispersal pipeline by calling an API for creating, changing, and deleting a pipeline infra (for example, AWS EMR and GCP Dataproc) through a client provided from the cloud service providing server.

At operation S1040, the pipeline control server 1000 may schedule an operation time point of the data dispersal pipeline according to a time point at which an operation event of the data ingestion pipeline is detected. In an embodiment of the disclosure, the pipeline control server 1000 may control the operation time point of the data dispersal pipeline based on time information of the data ingestion pipeline obtained at operation S1020, that is, information about at least one of a time at which data is extracted by the data ingestion pipeline, a time point at which the extracted data is transformed, or a time point at which a loading of the transformed data is terminated. In other words, the pipeline control server 1000 may schedule the data dispersal pipeline to operate according to a time point at which the data ingestion pipeline operates, thereby synchronizing the operation of the data dispersal pipeline with the operation of the data ingestion pipeline.

In an embodiment of the disclosure, when an operation event of the data ingestion pipeline is not detected, for example, when the data ingestion pipeline is idle, the pipeline control server 1000 may schedule the data dispersal pipeline to maintain in an idle state.

Figure 11:
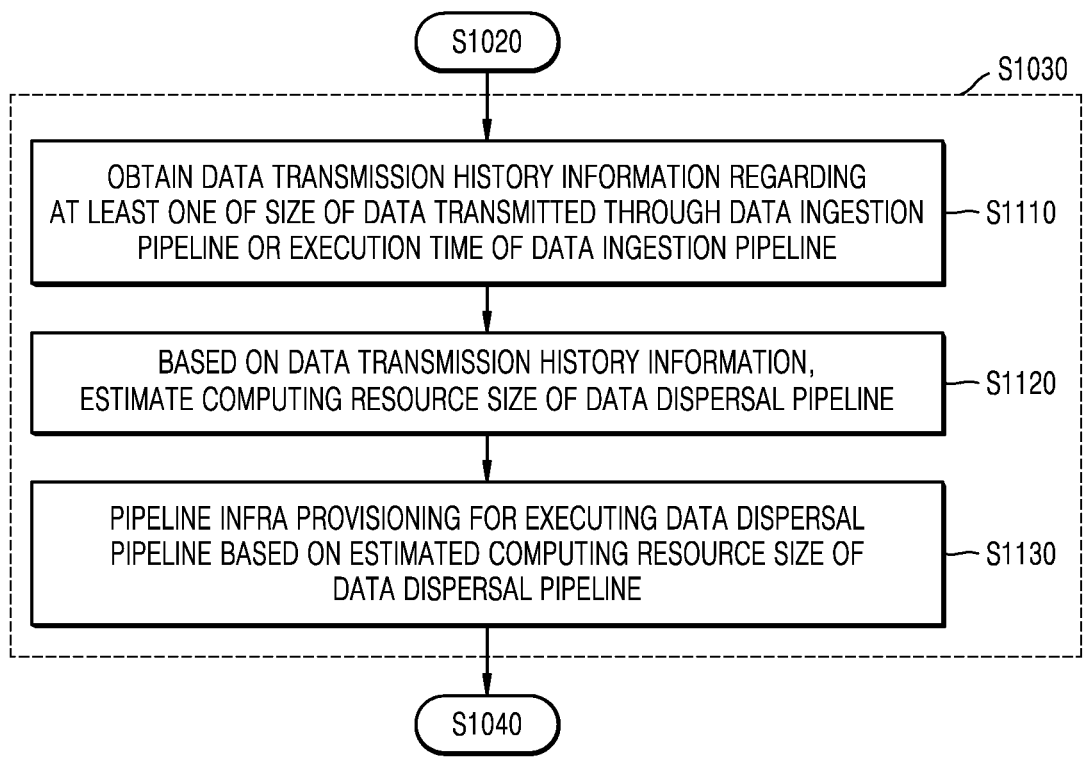
FIG. 11 is a flowchart of a method of provisioning, by a pipeline control server, an infra of a data dispersal pipeline, according to an embodiment of the disclosure.

FIG. 11 is a flowchart of a method of provisioning, by the pipeline control server 1000, an infra of a data dispersal pipeline, according to an embodiment of the disclosure.

Operations S1110, S1120, and S1130 shown in FIG. 11 are included operation S1030 shown in FIG. 10. Operation S1020 shown in FIG. 10 is followed by operation S1110. After operation S1130 is performed, operation S1040 shown in FIG. 10 is performed.

At operation S1110, the pipeline control server 1000 may obtain data transmission history information regarding at least one of a size of data transmitted through a data ingestion pipeline or an execution of the data ingestion pipeline. In an embodiment of the disclosure, the data transmission history information may include information about a total size of data transmitted through the data ingestion pipeline and time information regarding a time point at which data is extracted by the data ingestion pipeline, a time point at which the extracted data is transformed, and a time point at which a loading of the transformed data is terminated.

At operation S1120, the pipeline control server 1000 may estimate a computing resource size of the data dispersal pipeline based on the data transmission history information.

At operation S1130, the pipeline control server 1000 may perform a pipeline infra provisioning for executing the data dispersal pipeline, based on the estimated computing resource size of the data dispersal pipeline. For example, when data is extracted, transformed, and loaded at 5:00 pm every day and data transmission history information indicating that 1 TeraByte (TB) data is transmitted is obtained, the pipeline control server 1000 may provision a pipeline infra of the data dispersal pipeline as many as 8 CPU cores, 32 GigaByte (GB) Memory, and 8 Instances, at operation S1110.

A program executed by the pipeline control server 1000 described in the specification may be implemented by hardware components, software components, and/or a combination of hardware components and software components. A program may be executed by any system capable of executing computer-readable instructions.

Software may include a computer program, a code, an instruction, or a combination of one or more thereof, and may configure a processing device to operate as desired or independently or collectively instruct the processing device.

The software may be implemented with a computer program including instructions stored in a non-transitory computer-readable recording (or storage) medium. Examples of the computer-readable recording medium may include magnetic storage media (e.g., read-only memory (ROM), random-access memory (RAM), floppy disks, and hard disks) and optical recording media (e.g., compact disc-ROM (CD-ROM) and digital versatile discs (DVDs)). The computer-readable recording medium may also be distributed over network coupled computer systems so that the computer-readable code is stored and executed in a distributed fashion. This media may be read by the computer, stored in the memory, and executed by the processor.

The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A program according to embodiments of the disclosure disclosed in the specification may be included and provided in a computer program product. The computer program product may be a commercial product that may be traded between a seller and a buyer.

The computer program product may include a software program and a computer-readable storage medium having the software program stored thereon. For example, the computer program product may include a product (e.g., a downloadable application) in the form of an S/W program electronically distributed through a manufacturer or the device or an electronic market (e.g., Google Play Store or App Store). For the electronic distribution, at least a portion of the software program may be stored in a storage medium or arbitrarily created. In this case, the storage medium may be one of a server of the manufacturer or of a relay server that temporarily stores the software program.

The computer program product may include a storage medium of a server or a storage medium of a device in a system including the server and the device. Alternatively, when there is a third device (e.g., a smartphone) connected with the server or the device for communication, the computer program product may include a storage medium of the third device. Alternatively, the computer program product may include a software program itself transmitted to the device or the third device from the server or to the device from the third device.

In this case, one of the server, the device, and the third device may perform a method according to the embodiments of the disclosure by executing the computer program product. Alternatively, at least two of the server, the device, and the third device may perform the method according to the embodiments of the disclosure in a distributed fashion by executing the computer program product.

For example, the server may execute the computer program product stored the server to control the device connected to the server through communication such that the device performs the methods according to the embodiments of the disclosure.

In another example, the third device may execute the computer program product to control the device communicating with the third device to perform the method according to the embodiment of the disclosure.

When the third device executes the computer program product, the third device may download the computer program product from the server and execute the downloaded computer program product. Alternatively, the third device may execute a computer program product provided in a preloaded state to execute the method according to the disclosed embodiments.

Although some embodiments of the disclosure have described above with reference to the accompanying drawings, it will be apparent to those of ordinary skill in the art that various modifications and changes can be made to the embodiments. For example, even when described techniques are performed in a sequence different from the described method and/or components such as computer systems, modules, etc., are combined or connected differently from the described method, or replaced with other components or equivalents, an appropriate result may be achieved.

What is claimed is:

1. A method of controlling data transmission through a data pipeline, the method comprising:
   detecting a registration event of a data sink for receiving data from a data source;
   based on the registration event of the data sink, obtaining parameter information including at least one of a maximum connectable number of data sources, a number of data sinks, a region in which a cloud service providing server is located, or a number of data sinks for each region;
   determining, based on the parameter information, a provisioning region of a data broker including a message queue; and
   provisioning, based on the provisioning region of the data broker, a pipeline infrastructure (infra) for executing the data pipeline that performs movement and transformation of data between the data source and the data broker and between the data broker and the data sink.

2. The method of claim 1, further comprising scheduling for determining an operation time point of the data pipeline for transmitting data through the data pipeline.

3. The method of claim 1, wherein the determining the provisioning region of the data broker comprises:
   comparing the maximum connectable number of the data sources with the number of the data sinks; and
   determining, based on a result of the comparing, whether to create the data broker.

4. The method of claim 1, wherein the data sink comprises a plurality of data sinks, and
   the determining the provisioning region of the data broker comprises determining a region in which the plurality of data sinks are located, as the provisioning region of the data broker.

5. The method of claim 1, wherein a first data sink that is pre-registered is located in a first region,
   the detecting the registration event of the data sink comprises detecting a new registration event of receiving information of a second data sink located in a second region, and
   the determining the provisioning region of the data broker comprises determining whether to additionally create a new data broker in the second region based on a number of second data sinks that are newly registered, a network cost of transmitting data through the data pipeline, and an operational cost of the data broker.

6. The method of claim 1, further comprising identifying whether the pipeline infra for executing the data pipeline is provisioned.

7. The method of claim 1, wherein the detecting the registration event of the data sink comprises:
   detecting a state change related to creation and location movement of the data sink according to a preset time interval; and
   based on the state change of the data sink being detected, obtaining information of the data sink.

8. A server for controlling data transmission through a data pipeline, the server comprising:
   a network interface configured to transmit data to and receive data from a cloud service providing server;
   a memory storing a program including one or more instructions; and
   a processor configured to execute the one or more instructions to:
   detect a registration event of a data sink for receiving data from a data source of the cloud service providing server,
   based on the registration event of the data sink, obtain parameter information including at least one of a maximum connectable number of data sources, a number of data sinks, a region in which the cloud service providing server is located, or a number of data sinks for each region.
   determine, based on the parameter information, a provisioning region of a data broker including a message queue, and
   provision, based on the provisioning region of the data broker, a pipeline infrastructure (infra) for executing the data pipeline that performs a movement and transformation of data between the data source and the data broker and between the data broker and the data sink.

9. The server of claim 8, wherein the processor is further configured to execute the one or more instructions to obtain, through the network interface, at least one of the number of data sinks, a region in which the data sink is located, a type of the data sink, credential information of the data sink, a transformation configuration of the data pipeline, or schedule information regarding an operation time point of the data pipeline.

10. The server of claim 8, wherein the processor is further configured to execute the one or more instructions to:
    compare the maximum connectable number of the data sources with the number of the data sinks, and
    determine whether to create the data broker based on a result of the comparison.

11. The server of claim 8, wherein the data sink comprises a plurality of data sinks, and
    wherein the processor is further configured to execute the one or more instructions to determine a region in which the plurality of data sinks are located as the provisioning region of the data broker.

12. The server of claim 8, wherein a first data sink that is pre-registered is located in a first region, and
    wherein the processor is further configured to execute the one or more instructions to:
    detect a new registration event of receiving information about a second data sink located in a second region, and
    determine whether to additionally create a new data broker in the second region by considering a number of second data sinks that are newly registered, a network cost of transmitting data through the data pipeline, and an operational cost of the data broker.

13. The server of claim 8, wherein the processor is further configured to execute the one or more instructions to identify whether the pipeline infra for executing the data pipeline is provisioned.

14. The server of claim 8, wherein the processor is further configured to execute the one or more instructions to:
   detect a state change related to creation and location movement of the data sink according to a preset time interval, and
   based on the state change of the data sink being detected, obtain information about the data sink.

15. A computer program product including a non-transitory computer-readable storage medium storing instructions that when executed by a server, cause the server to perform a method of controlling data transmission through a data pipeline, the method comprising:
   detecting a registration event of a data sink for receiving data from a data source,
   based on the registration event of the data sink, obtaining parameter information including at least one of a maximum connectable number of data sources, a number of data sinks, a region in which a cloud service providing server is located, or the number of data sinks for each region,
   determining a provisioning region of a data broker including a message queue based on the parameter information, and
   provisioning, based on the provisioning region of the data broker, a pipeline infra for executing the data pipeline that performs a movement and transformation of data between the data source and the data broker and between the data broker and the data sink.

* * * * *